United States Patent
Hiramatsu et al.

(10) Patent No.: US 8,297,709 B2
(45) Date of Patent: Oct. 30, 2012

(54) SEAT BELT RETRACTOR AND SEAT BELT APPARATUS HAVING THE SAME

(75) Inventors: Koji Hiramatsu, Tokyo (JP); Takahiro Nohara, Tokyo (JP)

(73) Assignee: Takata Corporation, Tokyo (JP)

( * ) Notice: Subject to any disclaimer, the term of this patent is extended or adjusted under 35 U.S.C. 154(b) by 337 days.

(21) Appl. No.: 12/585,599

(22) Filed: Sep. 18, 2009

(65) Prior Publication Data

US 2010/0123348 A1 May 20, 2010

(30) Foreign Application Priority Data

Nov. 17, 2008 (JP) .................................. 2008-293396
Feb. 9, 2009 (JP) .................................. 2009-027179

(51) Int. Cl.
*B60R 22/00* (2006.01)
*B60R 22/36* (2006.01)

(52) U.S. Cl. ........................................ 297/471; 297/476

(58) Field of Classification Search .................. 297/471, 297/472, 474, 475, 476, 477, 478; 242/379.1; 280/806

See application file for complete search history.

(56) References Cited

U.S. PATENT DOCUMENTS

| | | | |
|---|---|---|---|
| 6,216,972 B1 | 4/2001 | Rohrle | |
| 6,250,579 B1 | 6/2001 | Bannert et al. | |
| 6,598,822 B2 * | 7/2003 | Nagata et al. | 242/379.1 |
| 6,926,221 B2 | 8/2005 | Rohrle et al. | |
| 7,025,297 B2 | 4/2006 | Bell et al. | |
| 2005/0139712 A1 | 6/2005 | Rohrle et al. | |
| 2006/0237572 A1 | 10/2006 | Hiramatsu | |
| 2006/0273210 A1 * | 12/2006 | Clute et al. | 242/374 |
| 2007/0120000 A1 * | 5/2007 | Gray | 242/379.1 |
| 2008/0029633 A1 | 2/2008 | Hiramatsu | |
| 2008/0099594 A1 | 5/2008 | Hiramatsu | |

FOREIGN PATENT DOCUMENTS

| | | |
|---|---|---|
| JP | H10-258702 A | 9/1998 |
| JP | 2001-58559 A | 3/2001 |
| JP | 2001-106025 A | 4/2001 |
| JP | 2002-53007 A | 2/2002 |
| JP | 2002-53008 A | 2/2002 |
| JP | 2002-87209 A | 3/2002 |
| JP | 2005-47449 A | 2/2005 |
| JP | 2005-170266 A | 6/2005 |
| JP | 2006-62632 A | 3/2006 |
| JP | 2007-084042 A | 4/2007 |

* cited by examiner

*Primary Examiner* — Sarah B McPartlin
(74) *Attorney, Agent, or Firm* — Manabu Kanesaka

(57) ABSTRACT

A seat belt retractor for a seat belt includes a spool for winding the seatbelt, a first seat belt load limiting mechanism for limiting load applied on the seat belt in an emergency, a second seat belt load limiting mechanism for limiting the load applied to the seat belt when a predetermined condition based on an emergency situation is satisfied in the emergency, a driving member for actuating the second seat belt load limiting mechanism, and a controller for controlling the driving member. When the predetermined condition is satisfied, the controller sets the second seat belt load limiting mechanism in an operative state by not actuating the driving member. When the predetermined condition is not satisfied, the controller sets the second seat belt load limiting mechanism in an inoperative state by actuating the driving member.

11 Claims, 18 Drawing Sheets

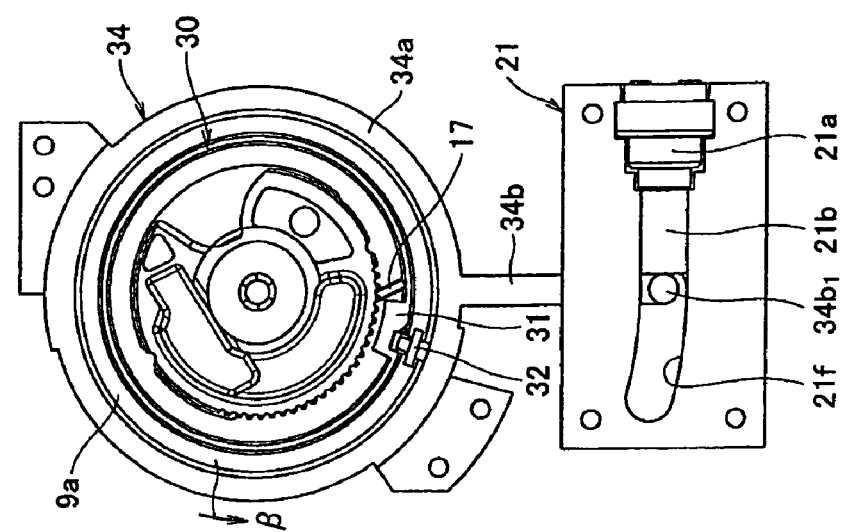
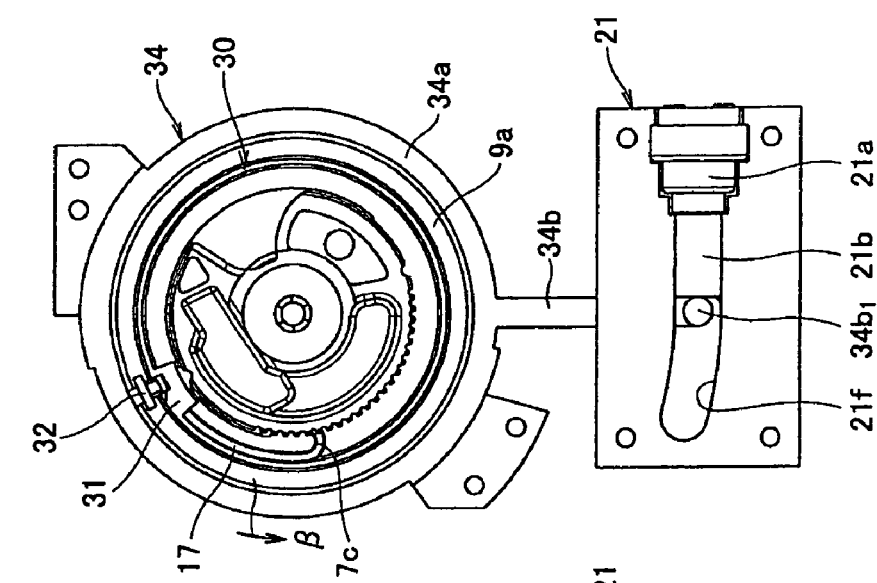
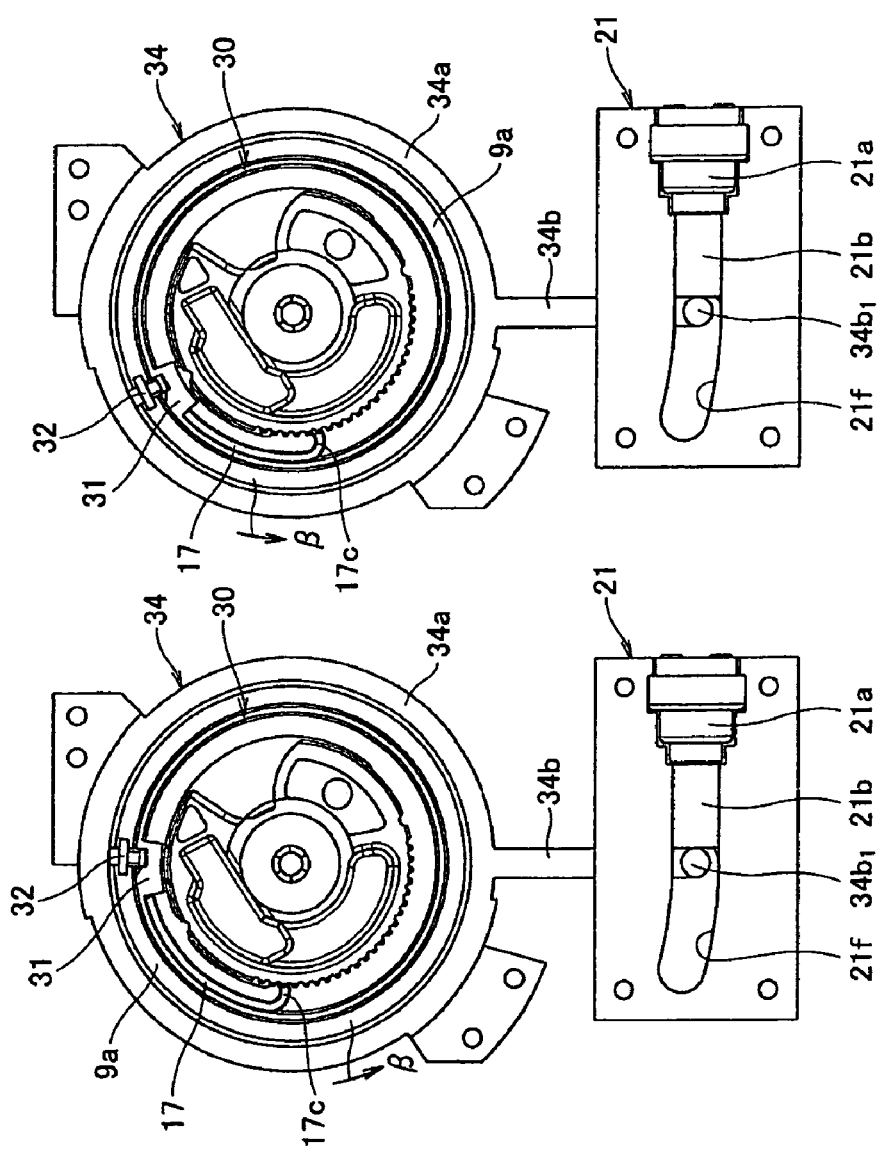

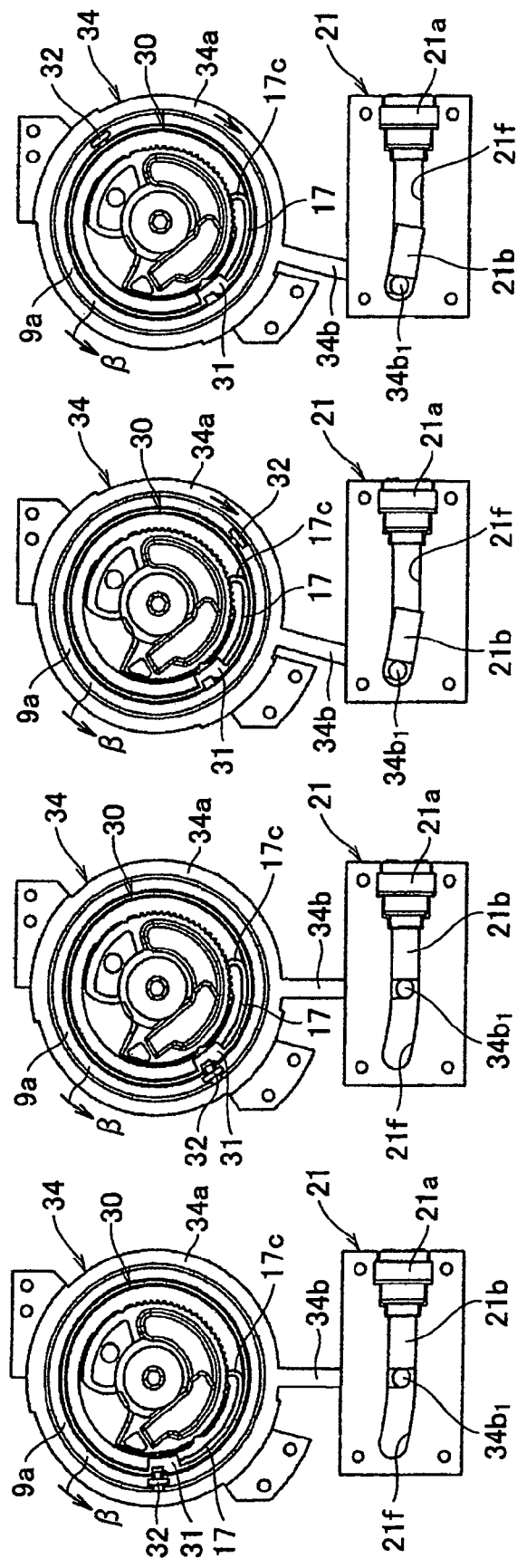

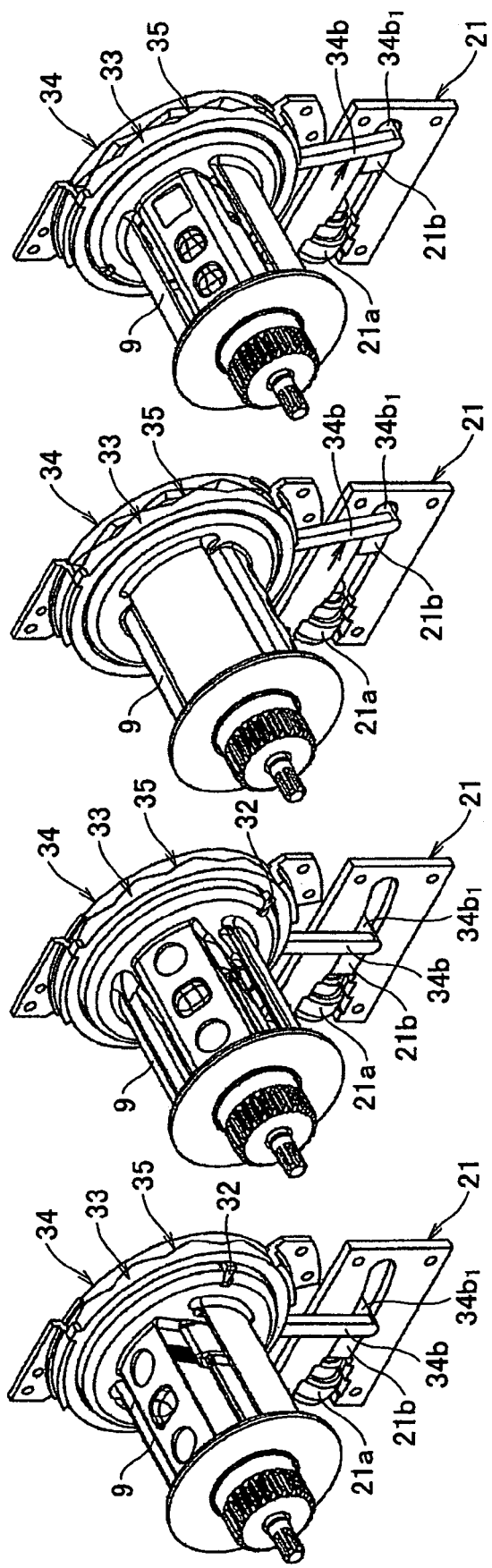

SEAT BELT RETRACTOR AND SEAT BELT APPARATUS HAVING THE SAME

BACKGROUND OF THE INVENTION AND RELATED ART STATEMENT

The present invention relates to a technical field of a seat belt retractor for winding up a seat belt while allowing winding and withdrawal of the seat belt. More particularly, the present invention relates to a technical field of a seat belt retractor provided with a seat belt load limiting mechanism (hereinafter, sometimes referred to as "EA mechanism"), which, by means of an energy absorbing member such as torsional deformation of a torsion bar, limits load acting on the seat belt to absorb energy added to an occupant when the seat belt is locked in the event of an emergency such as a vehicle collision where a large deceleration acts on the vehicle under the condition that the occupant wears the seat belt, and a seat belt apparatus having the same.

Conventionally, a seat belt apparatus installed in a vehicle such as an automobile restrains an occupant with a seat belt thereof in the event of the emergency as mentioned above. The seat belt apparatus comprises a seat belt retractor. In the seat belt retractor, the seat belt is wound onto a spool when the seat belt apparatus is not used and is withdrawn from the spool to be worn by the occupant when the seat belt apparatus is used. A locking mechanism of the seat belt retractor is actuated in the event of an emergency as mentioned above so as to prevent the spool from rotating in a belt withdrawing direction, thereby preventing the seat belt from being withdrawn. Accordingly, the seat belt restrains the occupant in the event of the emergency.

In the seat belt retractor of the conventional seat belt apparatus, the occupant is forced to move forward due to large inertia because a large deceleration acts on the vehicle when the seat belt restrains the occupant in the event of the emergency such as the vehicle collision. Accordingly, a large load is applied to the seat belt and the occupant receives a significant force from the seat belt. This force does not cause a serious problem to the occupant, but it is preferable to limit this force.

For limiting this force, a seat belt retractor has been proposed which is provided, in addition to a torsion bar, with a second EA mechanism which can operate independently so as to further flexibly and variously set the limited load applied on the seat belt according to information in the event of the emergency (for example, see Japanese Unexamined Patent Application Publication No. JP-A-2008-114659: Patent Document 1). According to the seat belt retractor disclosed in Patent Document 1, the limited load can be flexibly and variously set according to the situation in the event of the emergency. Therefore, it is possible to effectively and suitably restrain the occupant during the vehicle collision.

In the seat belt retractor disclosed in Patent Document 1, it is necessary to activate a gas generator for the second EA mechanism whenever the second EA mechanism is operated. Therefore, the second EA mechanism cannot be effectively operated.

The present invention has been made under the aforementioned circumstances and an object of the present invention is to provide a seat belt retractor wherein, in addition to a first EA mechanism, a second EA mechanism is independently and effectively operated so as to flexibly and variously set the limited load applied to the seat belt depending on the emergency situation, and a seat belt apparatus having the same.

Further objects and advantages of the invention will be apparent from the following description of the invention.

SUMMARY OF THE INVENTION

To solve the aforementioned problems, a seat belt retractor according to the invention comprises: a spool onto which a seatbelt is wound; a first seat belt load limiting mechanism for limiting load applied on said seat belt when an emergency occurs; a second seat belt load limiting mechanism for limiting load applied to said seat belt when the emergency occurs and a predetermined condition based on the emergency situation is satisfied; a driving member for actuating said second seat belt load limiting mechanism; and a controller for controlling said driving member, wherein the controller actuates said second seat belt load limiting mechanism by not actuating said driving member when said predetermined condition is satisfied, and does not actuate said second seat belt load limiting mechanism by actuating said driving member when said predetermined condition is not satisfied.

According to the present invention, when said controller determines that the actuation of said second seat belt load limiting mechanism is required, but the entire operation of said second seat belt load limiting mechanism is not required, said controller stops the operation of said second seat belt load limiting mechanism by actuating said driving member after said second seat belt load limiting mechanism is actuated and before the entire operation of said second seat belt load limiting mechanism is completed.

A seat belt retractor according to the present invention further comprises a locking mechanism having a locking member which is configured to normally rotate together with said spool by transmission of rotation of said spool via the first seat belt load limiting mechanism and is prevented from rotating in the seatbelt withdrawing direction when the emergency occurs, wherein when said locking member is prevented from rotating in the seat belt withdrawing direction so that said spool rotates in the seat belt withdrawing direction relative to said locking member, load applied on said seat belt is limited by at least said first seat belt load limiting mechanism.

Further, said second seat belt load limiting mechanism comprises a supporting member for the energy absorbing member which is disposed coaxially with said spool and rotatable relative to said spool, and an energy absorbing member which is disposed between said locking member and said supporting member and is deformed by rotation of said spool in the seat belt withdrawing direction, wherein said controller sets said second seat belt load limiting mechanism to an inoperative state by setting said supporting member to the immovable state by actuating said driving member when the emergency occurs and said predetermined condition is not satisfied, and sets said second seat belt load limiting mechanism to the operative state by setting said supporting member to the movable state by not actuating said driving member when the emergency occurs and said predetermined condition is satisfied.

Further, a seat belt retractor according to the present invention is such that said energy absorbing member comprises a long band-like energy absorbing plate.

Furthermore, a seat belt retractor according to the present invention is such that said first seat belt load limiting mechanism comprises a torsion bar disposed between said spool and said locking member.

On the other hand, a seat belt apparatus according to the present invention comprises at least: a seat belt retractor which winds up a seat belt, a tongue slidably supported on the seat belt withdrawn from said seat belt retractor; and a buckle detachably latched with said tongue, wherein said seat belt is prevented from being withdrawn by said seat belt retractor so as to restrain the occupant when the emergency occurs, and said seat belt retractor is one of the seat belt retractors according to the present invention.

In addition, a seat belt apparatus according to the present invention further comprises a pretensioner which is actuated to directly rotate said spool in the seat belt winding direction when the emergency occurs.

According to the seat belt retractor of the invention having the aforementioned structure and the seat belt apparatus having the same, the limited load on the seat belt in the event of the emergency is changed by controlling the operation of the first and second seat belt load limiting mechanisms based on information of the situation of the emergency such as preliminary information (the weight of the occupant and the position of a seat in the front-rear direction, and the like), collision-predicting information indicating that a collision is going to occur, and information indicating the collision severity (the collision speed, the acceleration during the collision, and the type of collision, and the like). Therefore, the limited load of the seat belt during a collision can be set more flexibly and variously depending on the conditions under the collision and the information in the emergency situation, such as the physical size of the occupant. Accordingly, the occupant can be more effectively and suitably restrained during the collision.

In this case, the second seat belt load limiting mechanism is actuated by not actuating the driving member, while the second seat belt load limiting mechanism is not actuated by actuating the driving member. Accordingly, when the actuation of the second seat belt load limiting mechanism is required, there is no need to actuate the driving member to generate reaction gas. Consequently, the occupant is further effectively restrained during the collision because of the effect actuation of the second seat belt load limiting mechanism.

When it is determined that the actuation of the second seat belt load limiting mechanism is required, but the entire operation of the second seat belt load limiting mechanism is not required in the event of the emergency, the operation of the second seat belt load limiting mechanism is stopped by actuating the driving member after the second seat belt load limiting mechanism is actuated, but before the entire operation of the second seat belt load limiting mechanism is completed. That is, even after the second seat belt load limiting mechanism is actuated, it is possible to stop the operation of the second seat belt load limiting mechanism depending on the emergency situation. Therefore, the kinetic energy absorption (EA) for the occupant in the event of an emergency can be further finely and correctly conducted.

Further, since the energy absorbing member is provided between the locking member and the supporting member for the energy absorbing member, the pretensioner which must operate in the event of the emergency can be arranged to directly rotate the spool in the belt winding direction.

Further, since the second seat belt load limiting mechanism is disposed coaxially with the spool, the seat belt retractor is small in the vertical direction. In addition, the first seat belt load limiting mechanism is composed of the torsion bar, thereby achieving the seat belt retractor having simpler structure and smaller size. The available space of the vehicle cabin is thus increased.

Furthermore, since the spool is designed to be rotated in the seat belt winding direction directly by the pretensioner, the pretensioner effectively conducts the seat belt winding operation in the event of the emergency even though the first and second seat belt load limiting mechanisms are provided.

BRIEF DESCRIPTION OF THE DRAWINGS

FIGS. 12(a) and 12(b) show the operable state of the second EA mechanism of the seat belt retractor shown in FIGS. 11(a) and 11(b), wherein FIG. 12(a) is a partial perspective view and FIG. 12(b) is a partial schematic view.

FIGS. 13(a) and 13(b) show the inoperable state of the second EA mechanism of the seat belt retractor shown in FIGS. 11(a) and 11(b), wherein FIG. 13(a) is a partial perspective view and FIG. 13(b) is a partial schematic view.

FIGS. 15(a) through 15(c) are illustrations for explaining the operation of the second EA mechanism of the seat belt retractor of the embodiment shown in FIGS. 11(a) and 11(b).

FIGS. 17(1)(a) through 17(1)(d) and FIGS. 17(2)(a) through 17(2)(d) are illustrations for explaining the operation and non-operation of the second EA mechanism of the seat belt retractor of the embodiment shown in FIGS. 11(a) and 11(b).

DETAILED DESCRIPTION OF PREFERRED EMBODIMENTS

Hereinafter, preferred embodiments for carrying out the present invention will be described with reference to the attached drawings.

Figure 1:
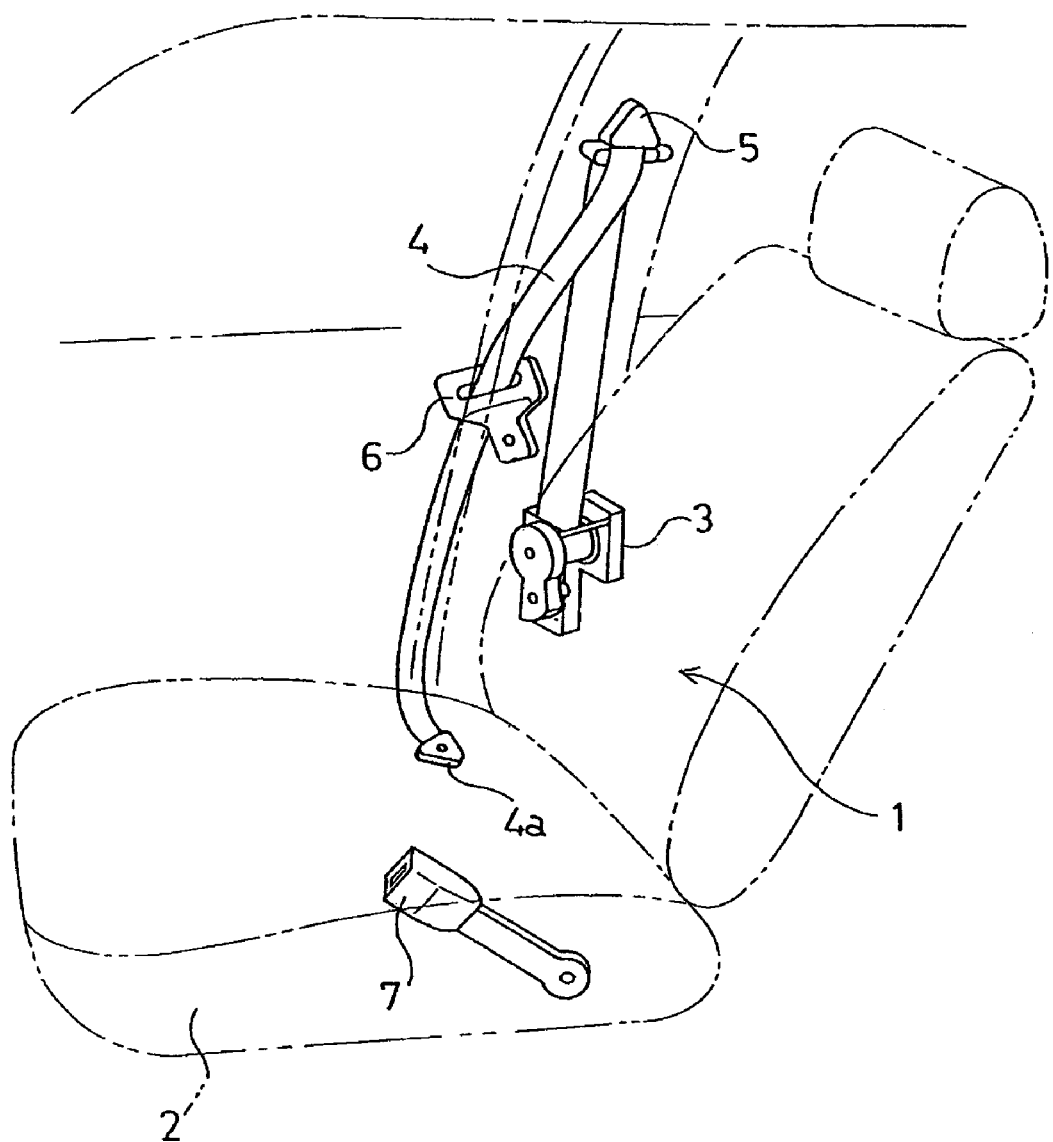
FIG. 1 is an illustration schematically showing a seat belt apparatus provided with an embodiment of a seat belt retractor according to the present invention.

FIG. 1 is an illustration schematically showing a seat belt apparatus employing an embodiment of a seat belt retractor according to the present invention.

As shown in FIG. 1, the seat belt apparatus 1 of this embodiment is similar to a conventionally known seat belt apparatus of a three-point type. That is, the seat belt apparatus 1 comprises a seat belt retractor 3 which is fixed to a vehicle body near the vehicle seat 2, a seat belt 4 which is retracted by the seat belt retractor 3 in such a manner as to allow the withdrawal of the seat belt 4 and is provided at its end with a belt anchor 4a fixed to a vehicle floor or the vehicle seat 2, a deflection fitting 5 for guiding the seat belt 4 withdrawn from the seat belt retractor 3 toward an occupant's shoulder, a tongue 6 which is slidably supported on the seat belt 4 guided by and extending from the deflection fitting 5, and a buckle 7 which is fixed to the vehicle floor or the vehicle seat and to which the tongue 6 can be inserted and detachably latched.

Figure 2:
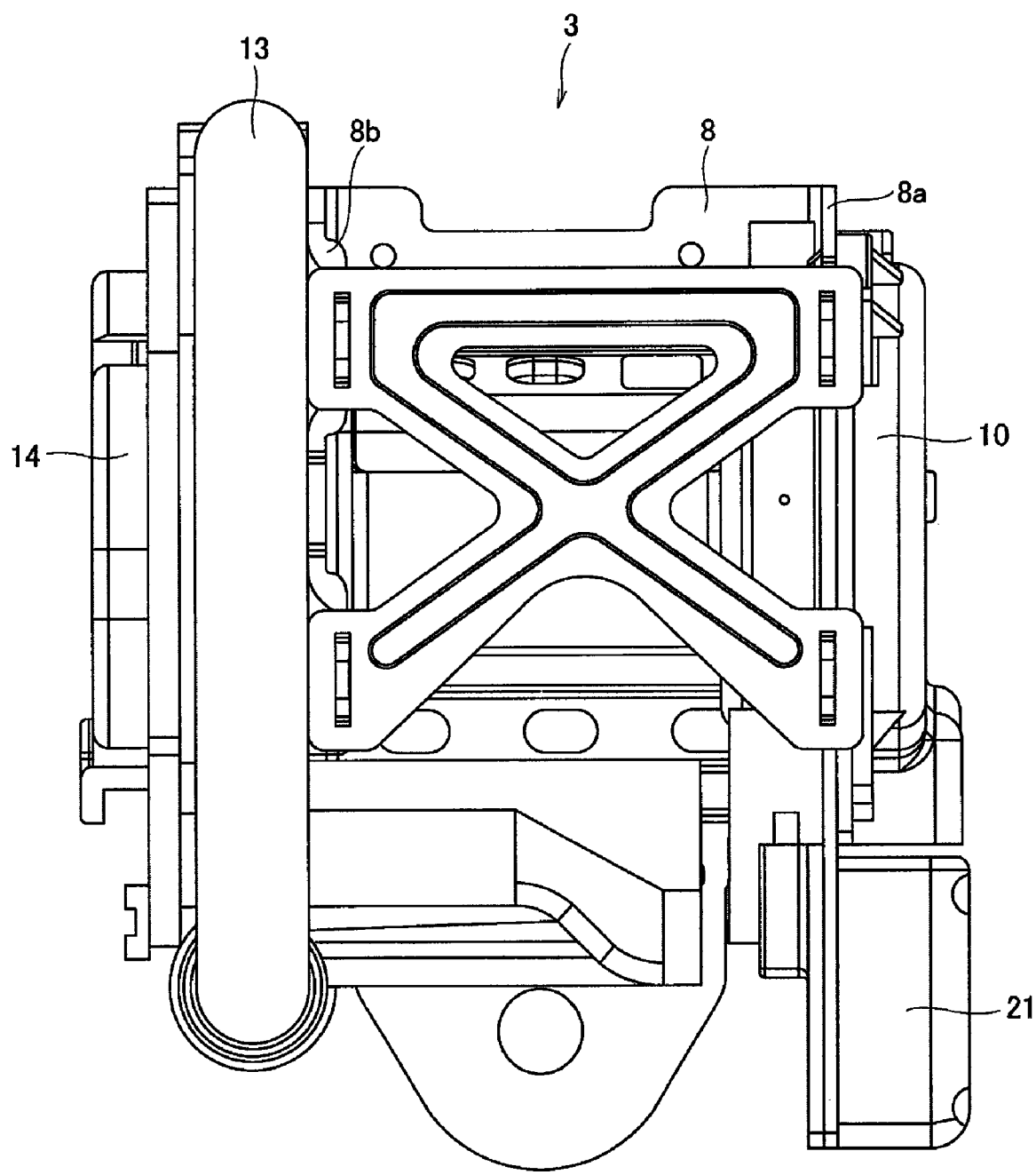
FIG. 2 is a front view of the seat belt retractor of the embodiment shown in FIG. 1.
Figure 3:
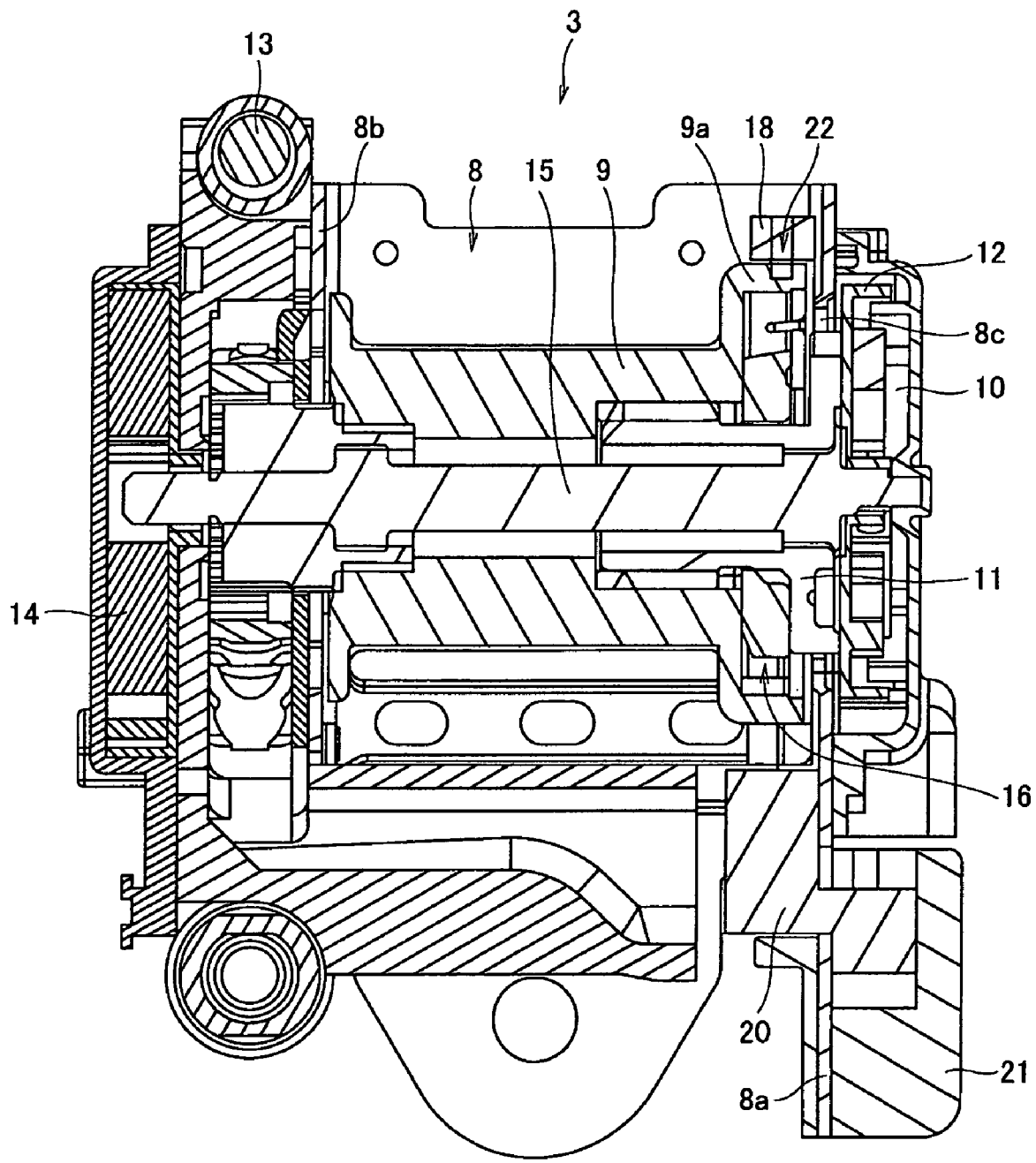
FIG. 3 is a vertical sectional view showing the seat belt retractor of the embodiment shown in FIG. 1.

FIG. 2 is a front view of the seat belt retractor of this embodiment and FIG. 3 is a vertical sectional view of the seat belt retractor of this embodiment.

As shown in FIGS. 2 and 3, the seat belt retractor 3 of this embodiment comprises a U-like frame 8 similarly to the emergency locking-type seat belt retractor (ELR) disclosed in the aforementioned Patent Document 1. A spool 9 onto which the seat belt 4 is wound is rotatably supported by the frame 8. On one of the side walls (the right-side wall in FIG. 3) 8a of the frame 8, a locking mechanism is disposed. The locking mechanism 10 has a locking base (corresponding to the locking member of the present invention) 11 rotatably attached to one of the ends of the spool 9 and a locking gear 12 rotatably attached to the locking base 11. On the other end wall (the left-side wall in FIG. 3) 8b of the frame 8, a pretensioner 13 and a spring mechanism 14 are attached. Between the spool 9 and the locking base 11, a torsion bar (a first EA mechanism; corresponding to the first seat belt load limiting mechanism of the present invention) 15 is disposed and, in addition, a second EA mechanism (corresponding to the second seat belt load limiting mechanism of the present invention) 16 is disposed.

The basic operation of the seat belt retractor 3 of this embodiment is the same as that of the seat belt retractor of the aforementioned Patent Document 1. That is, in the event of the emergency as mentioned above, a deceleration sensing mechanism (not shown) of a vehicle sensor (not shown) is activated to prevent the locking gear 12 of the locking mechanism 10 from rotating in the seat belt withdrawing direction. Then, a relative rotation is generated between the locking base 11 and the locking gear 12 so that a pawl (not shown) attached to the locking base 11 pivots and thus engages internal teeth 8c (shown in FIG. 3) formed in the side wall 8a of the frame 8. Accordingly, the rotation of the locking base 11 is stopped so as to prevent the spool 9 from rotating in the seat belt withdrawing direction. Also when the seat belt is rapidly withdrawn, the rotation of the locking gear 12 in the seat belt withdrawing direction is prevented by a webbing sensor (not shown) and, similarly, the rotation of the spool 9 in the seat belt withdrawing direction is prevented. Specific actions of the seat belt retractor 3 will be described later.

Figure 4:
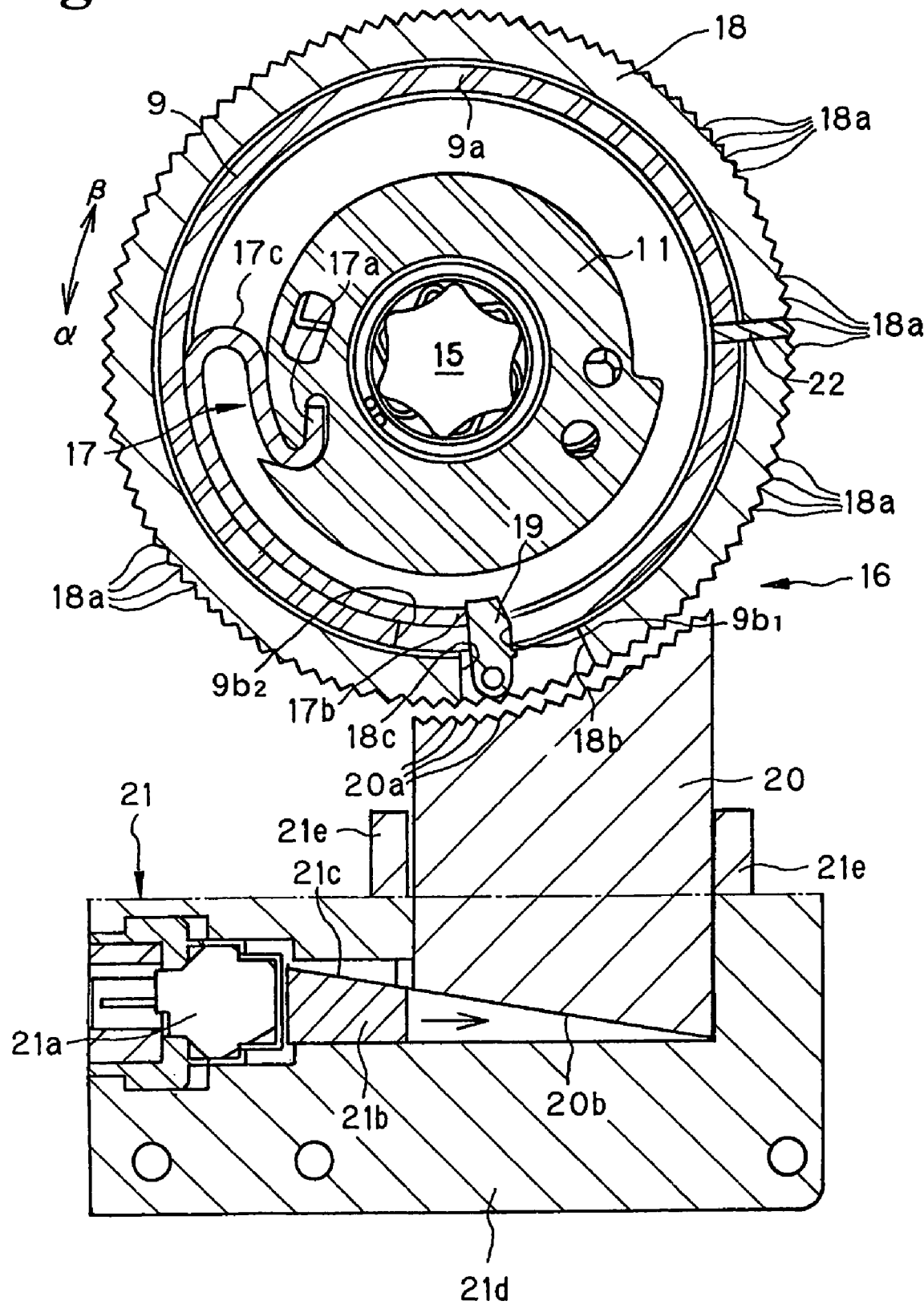
FIG. 4 is a sectional view schematically showing a second EA mechanism and a driving device of the embodiment shown in FIG. 3.

FIG. 4 is a sectional view schematically showing the second EA mechanism and the driving device of this embodiment.

As shown in FIGS. 3 and 4, the second EA mechanism 16 of this embodiment comprises an energy absorbing plate (EA plate) 17 as an energy absorbing member, an EA plate supporting member 18 which is formed around an outer periphery of a cylindrical portion 9a on one end (the right end in FIG. 3) of the spool 9 and has an annular disc-like shape, and an EA plate operating member 19 which is rotatably attached to the EA plate supporting member 18 to operate the energy absorbing plate 17 and has a lever-like shape. The seat belt retractor 3 of this embodiment has an EA operation controlling member 20 for controlling the operation of the second EA mechanism 16 by controlling the rotation of the EA plate supporting member 18, and a driving member 21 for driving the EA operation controlling member 20.

The energy absorbing plate 17 is composed of a long and thin band-like plate having a predetermined thickness and a predetermined width and having elasticity and is formed into an anomalous S-like shape as a whole. The energy absorbing plate 17 may be composed of a bar member. One end portion of the energy absorbing plate 17 is a first supporting portion 17a fixed to and supported by the locking base 11 and the other end portion 17b of the energy absorbing plate 17 can come in contact with the EA plate operating member 19 in the seat belt winding direction (counter-clockwise direction in FIG. 4). The energy absorbing plate 17 has a folded U-like portion 17c formed in the vicinity of the first supporting portion 17a. A portion between the U-like portion 17c and the other end of the energy absorbing plate 17 is normally in contact with the inner periphery of the cylindrical portion 9a of the spool 9.

The EA plate supporting member 18 is rotatably and coaxially fitted to the outer periphery of the cylindrical portion 9a of the spool 9. As shown in FIG. 3, normally, the EA plate supporting member 18 is connected to the spool 9 by a shear pin 22 so that the EA plate supporting member 18 rotates together with the spool 9. Once the shear pin 22 is sheared, the spool 9 and the EA plate supporting member 18 can rotate relative to each other. The EA plate supporting member 18 is provided with a predetermined number of serration teeth 18a formed in the outer periphery thereof.

The EA plate operating member 19 can move between a lying position where it is retracted in an opening 18b of the EA plate supporting member 18 and a standing position (position shown in FIG. 4) where it extends to the inner periphery of the cylindrical portion 9a through an opening 9b of the cylindrical portion 9a of the spool 9. When the EA plate operating member 19 is in the standing position as shown in FIG. 4, the EA plate operating member 19 is prevented from pivoting in a direction (counter-clockwise direction in FIG. 4) opposite to a direction toward the lying position by a circumferential inner end wall 18c of the opening 18b. When the EA plate operating member 19 is in the lying position of the EA plate supporting member 18, the EA plate operating member 19 is not in contact with the both ends of the opening 9b formed in the cylindrical portion 9a of the spool 9, wherein the ends extend in a direction perpendicular to the circumferential direction. When the EA plate operating member 19 is in the standing position of the EA plate supporting member 18, the EA plate operating member 19 can be in contact with the end walls $9b_1$, $9b_2$ of the opening 9b of the spool 9. Therefore, the second EA mechanism 16 is arranged coaxially with the spool 9.

The EA operation controlling member 20 is arranged to face the EA plate supporting member 18. The EA operation controlling member 20 has an arc concave face as a face thereof facing the EA plate supporting member 18 and is provided with a predetermined number of serration teeth 20a which are formed in the concave face. The EA operation controlling member 20 is arranged to move vertically between an inoperative position as a lower position shown in FIG. 4 where the teeth 20a do not mesh with the teeth 18a of the EA plate supporting member 18 and an operative position as an upper position where the teeth 20a mesh with the teeth 18a of the EA plate supporting member 18. When the EA operation controlling member 20 is in the inoperative position, the teeth 18, 20 do not mesh with each other so as to allow the rotation of the EA plate supporting member 18. When the EA operation controlling member 20 is in the operative position, the teeth 18, 20 mesh with each other so as not to allow the rotation of the EA plate supporting member 18. Further, the end face opposite to the face facing the EA plate supporting member 18 of the EA operation controlling member 20 is an inclined face 20b.

As shown in FIG. 3, the driving member 21 is disposed on the side wall 8a of the frame 8. As shown in FIG. 4, the driving member 12 has a gas generator 21a and a driving piston 21b inside thereof. The gas generator 21a is actuated in the event of an emergency to generate reaction gas and move the driving piston 21b toward the EA operation controlling member 20 by means of the reaction gas. The driving piston 21b has an inclined cam face 21c on its upper surface and the inclination of the cam face 21c is set to be the same or substantially the same as the inclination of the inclined face 20b of the EA operation controlling member 20. When the driving piston 21b is moved by the reaction gas, the driving piston 21b enters a space between the body 21d of the driving member 21 and the inclined face 20b of the EA operation controlling member 20 and moves upward the EA operation controlling member 20 because of the cam face 21c so that the EA operation controlling member 20 is set to the operative position. The body 21d of the driving member 21 is provided with a guide portion 21e for guiding the EA operation controlling member 20 during the upward movement of the EA operation controlling member 20.

Figure 5:
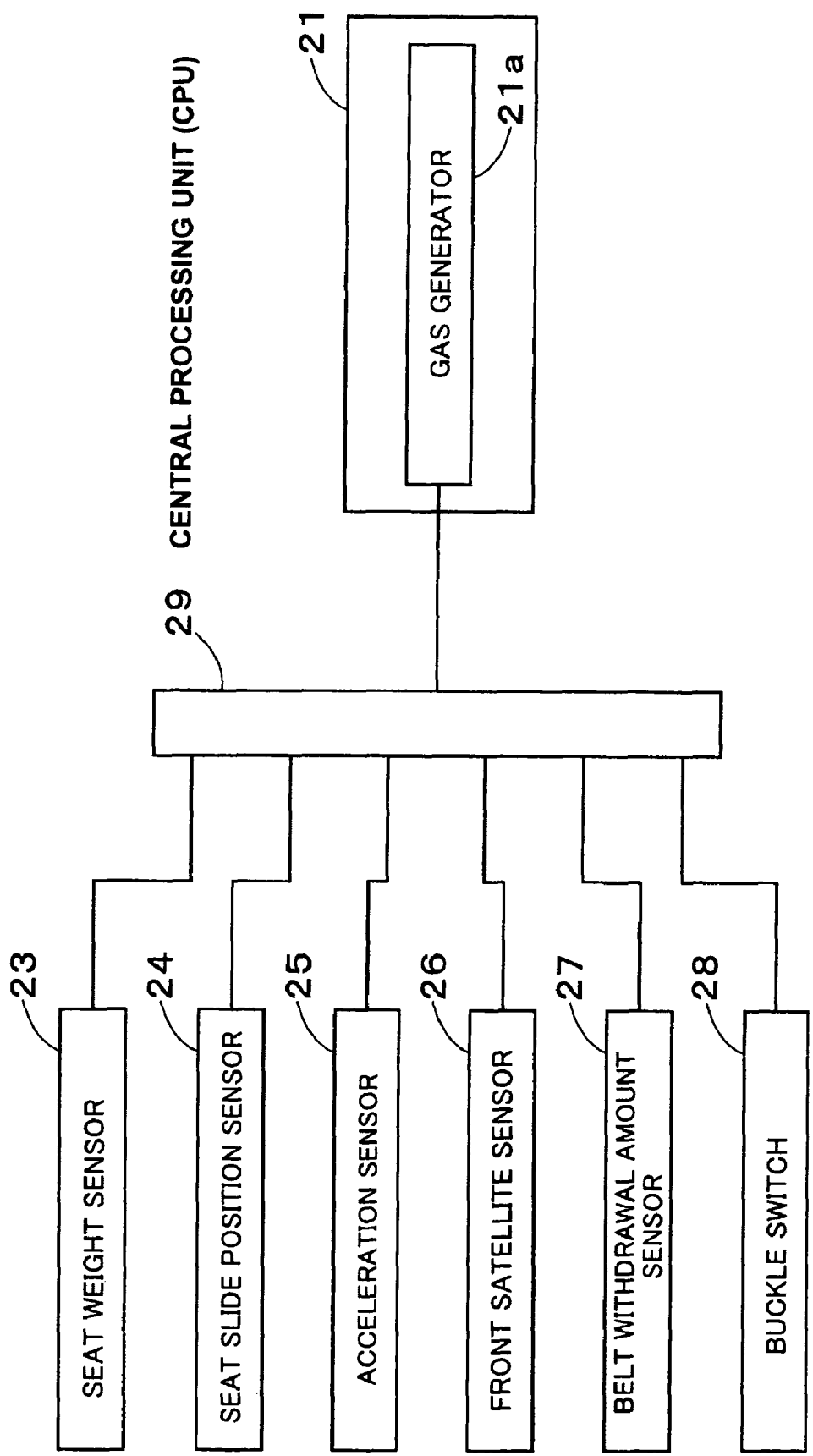
FIG. 5 is a block diagram for controlling the second EA mechanism and the driving device of the embodiment shown in FIG. 3.

As shown in FIG. 5, the gas generator 21a of the driving member 21 for controlling the operation of the second EA mechanism 16 of this embodiment is controlled its activation corresponding to an emergency situation by a CPU (corresponding to the controller of the present invention) 29 based on signals outputted from a seat weight sensor 23 for detecting the occupant's weight; a seat slide position sensor 24, an acceleration sensor 25 for detecting deceleration of the vehicle, a front satellite sensor 26 for detecting an obstacle in front of the vehicle, a belt withdrawal amount sensor 27, and a buckle switch 28. That is, the second EA mechanism 16 can operate independently from the torsion bar 15 as the first EA mechanism.

Then, the actions of the seat belt retractor 3 of this embodiment having the aforementioned structure will be described. Since actions of the seat belt retractor 3 of this embodiment by the same components as the conventional seat belt retractor 3 disclosed in the aforementioned Patent Document 1 are the same as those of the conventional seat belt retractor 3, the description about those actions will be omitted and only actions by the characteristic components of the seat belt retractor 3 of this embodiment will be described.

Figures 6A, 6B, 6C:
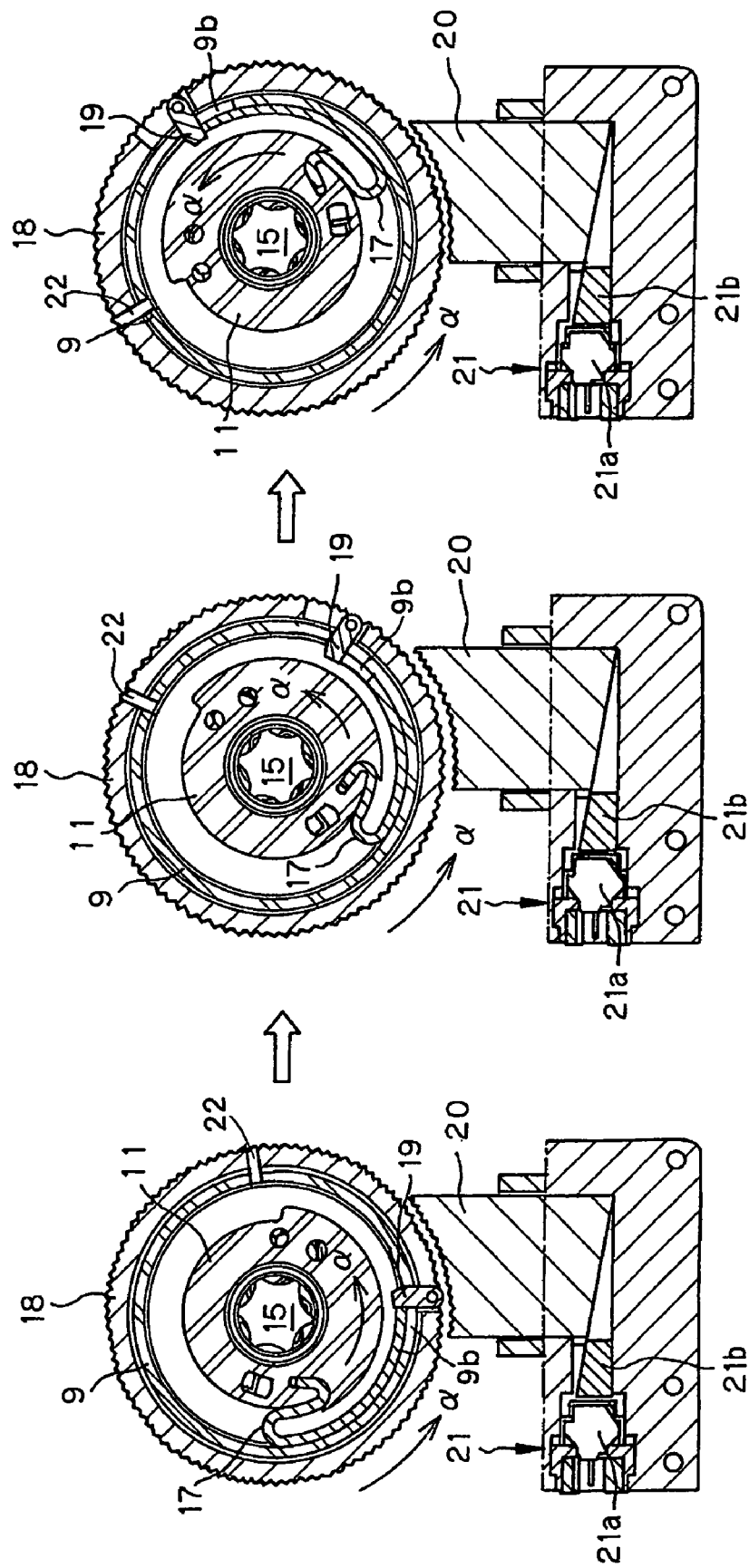
FIGS. 6(a) through 6(c) are illustrations for explaining the seat belt winding by a pretensioner when the second EA mechanism is actuated in the event of the emergency.

As shown in FIG. 4 and FIG. 6(a), when the seat belt 4 is normally used, the seat belt retractor 3 maintains the energy absorbing plate 17 in its inoperative state and maintains the EA plate operating member 19 in its standing position. When the standing position of the EA plate operating member 19 is maintained, the end walls $9b_1$ of the opening 9b of the spool 9 is in contact with the EA plate operating member 19 and the free end, i.e. the other end portion 17b of the energy absorbing plate 17 is in contact with the EA plate operating member 19. Therefore, the standing position of the EA plate operating member 19 is maintained. Therefore, the opening 9b of the spool 9 is located on the left side of the EA plate operating member 19 in FIG. 4 and FIG. 6 (a) The spool 9 and the EA plate supporting member 18 are connected together by the shear pin 22.

The EA operation controlling member 20 is in the inoperative position so that the teeth 20a do not mesh with the teeth 18a of the EA plate supporting member 18. Further, the gas generator 21a of the driving member 21 is not actuated so that the driving piston 21b does not enter the space below the inclined surface 20b of the EA operation controlling member 20.

As a deceleration which is significantly larger than that during the normal driving acts on the vehicle in the event of the emergency as mentioned above, the pretensioner 13 is actuated. When the CPU 29 judges the emergency situation based on the signals outputted from the respective sensors 23, 24, 25, 26, 27 and the buckle switch 28 and deter-mines that the absorption of the energy on the occupant by the second EA mechanism 16 is also required, that is, that a predetermined condition for actuating the second EA mechanism 16 is satisfied such as when the occupant has a relatively heavy weight or when a collision severe enough to actuate the pretensioner 13 and the airbag occurs, the CPU 29 does not activate the gas generator 21a of the driving member 21.

As shown in FIG. 6(a), the spool 9 is forced to rotate in the seat belt winding direction a directly by the actuation of the pretensioner 13 without the torsion bar 15 intervening. Since the EA operation controlling member 20 is set in its inoperative position, the EA plate supporting member 18 is free to rotate. Therefore, as shown in FIGS. 6(a) through 6(c), all of the spool 9, the locking base 11, and the EA plate supporting member 18 start to rotate in the seat belt winding direction α. Accordingly, a slack of the seat belt 4 worn by the occupant is removed so as to restrain the occupant. The energy absorbing plate 17 is maintained in its initial state.

Figures 7A, 7B, 7C:
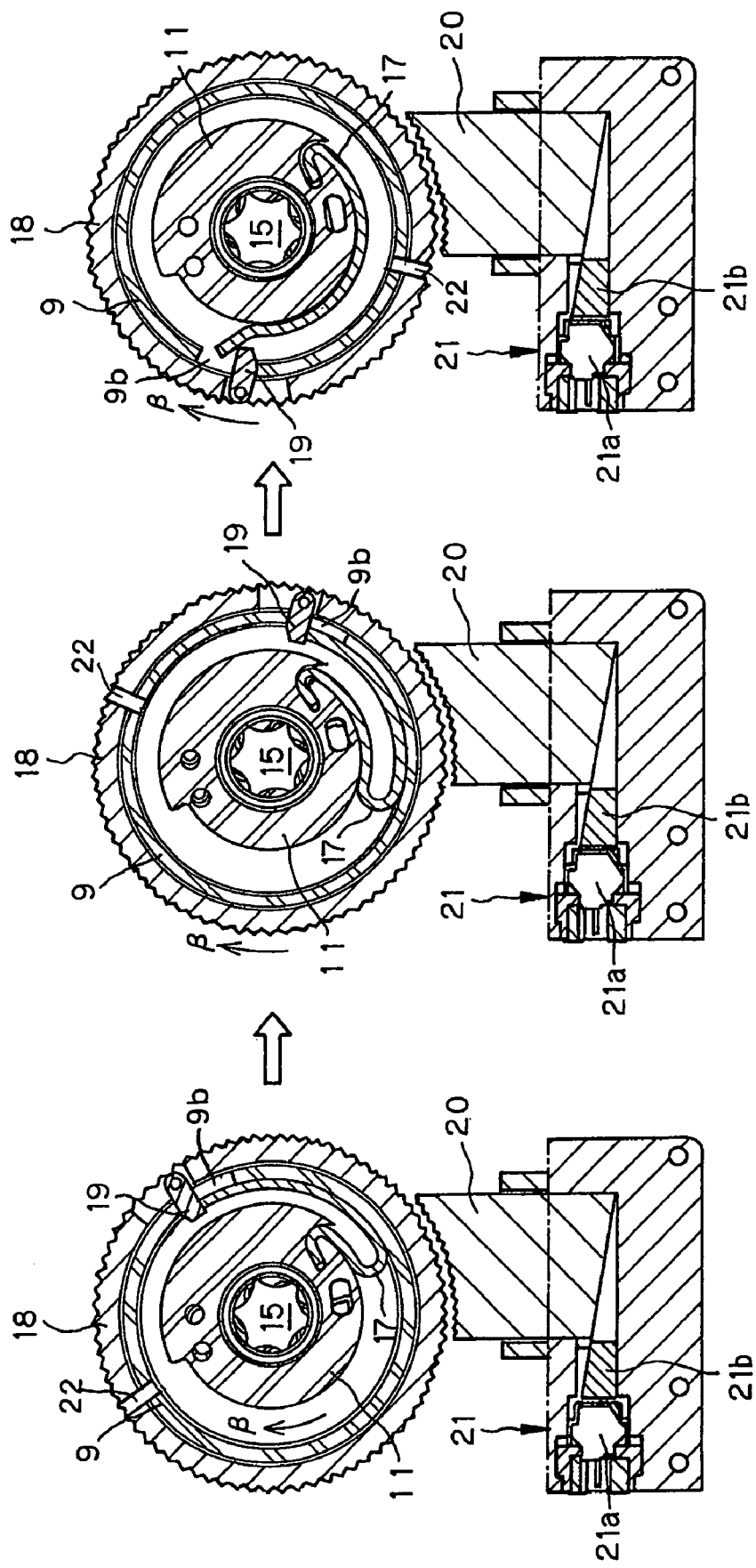
FIGS. 7(a) through 7(c) are illustrations for explaining the operation of the second EA mechanism in the event of an emergency.

As shown in FIG. 6(c), as the winding of the seat belt onto the spool 9 by the action of the pretensioner 13 is completed, the seat belt 4 starts to be withdrawn by inertia of the occupant. Then, as shown in FIG. 7(a), the spool 9 rotates in the seat belt withdrawing direction β. Therefore, the EA plate supporting member 18 connected to the spool 9 by the shear pin 22 rotates together with the spool 9 in the same direction β. On the other hand, the pawl pivots to engage the internal teeth 8c of the frame 8, thereby preventing the locking base 11 from rotating in the seat belt withdrawing direction β.

Then, since the spool 9 rotates in the seat belt withdrawing direction β and the rotation of the locking base 11 are prevented, the torsion bar 15 is torsionally deformed similarly to the conventional one. That is, the torsion bar 15 conducts the EA action so that the inertia energy of the occupant is absorbed by the torsion bar 15. At the same time, as shown in FIG. 7(b), the spool 9 and the EA plate supporting member 18 rotate together in the seat belt withdrawing direction β so that the one end wall $9b_1$ of the opening 9b of the spool 9 presses the EA plate operating member 19 in the seat belt withdrawing direction β.

Figure 8A:
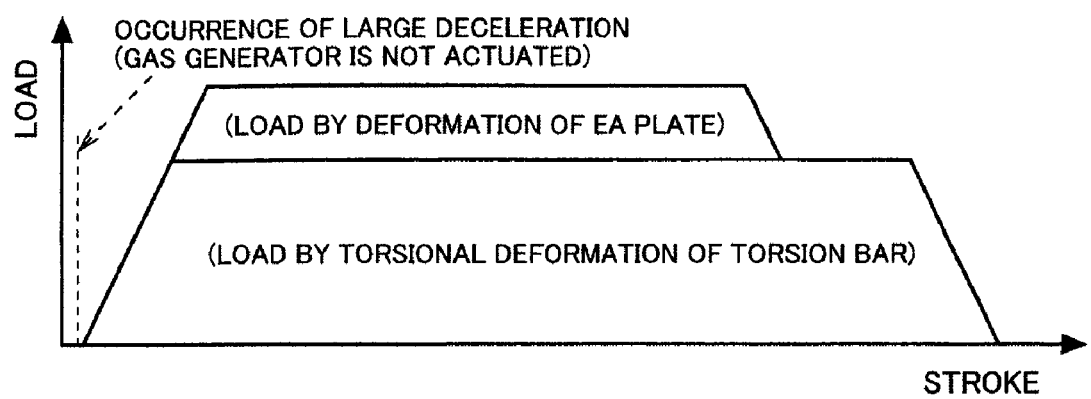
FIG. 8(a) is a graph showing limited load when the second EA mechanism is actuated, and FIG. 8 (b) is a graph showing limited load when the second EA mechanism is not actuated.

Then, as shown in FIG. 7(b), the energy absorbing plate 17 is deformed such that the U-like portion 17c gradually moves toward the other end portion 17b side. Accordingly, the energy applied to the occupant is also absorbed by the second EA mechanism 16. Therefore, as shown in FIG. 8(a), the limited load (EA load) becomes the sum of the load by torsional deformation of the torsion bar 15 and the load by deformation of the energy absorbing plate 17. Because of both of the deformation of the torsion bar 15 and the deformation of the energy absorbing plate 17 of the second EA mechanism 16, the energy applied to the occupant is effectively absorbed. As the deformation of the energy absorbing plate 17 is finished, the EA load becomes the load solely by the torsional deformation of the torsion bar 15.

As the energy absorbing plate 17 is completely reversed so that the energy absorption by the energy absorbing plate 17 is finished as shown in FIG. 7(c), the energy applied to the occupant is effectively absorbed solely by the torsion bar 17 as shown in FIG. 8(a).

As mentioned above, the second EA mechanism 16 effectively operates without actuating the gas generator 21a of the driving member 21, i.e. without generating reaction gas.

On the other hand, when the CPU 29 judges the emergency situation based on the signals outputted from the respective sensors 23, 24, 25, 26, 27 and the buckle switch 28 and determines that the absorption of the energy by the second EA mechanism 16 is not required, that is, that the aforementioned predetermined condition for actuating the second EA mechanism 16 is not satisfied such as when the occupant has a relatively light weight or when such a mild collision that the pretensioner 13 or the airbag is not actuated occurs, the CPU 29 actuates the gas generator 21a of the driving member 21. Therefore, the gas generator 21a generates reaction gas to move the driving piston 21b so that the driving piston 21b enters the space below the EA operation controlling member 20 as shown in FIG. 9(b). Then, by the inclined face 21c of the EA operation controlling member 20 and the cam face 21c of the driving piston 21b, the EA operation controlling member 20 is moved upward to the operative position where the teeth 20a mesh with the teeth 18a of the EA plate supporting member 18. Therefore, the EA plate supporting member 18 is prevented from rotating.

Figure 9A:
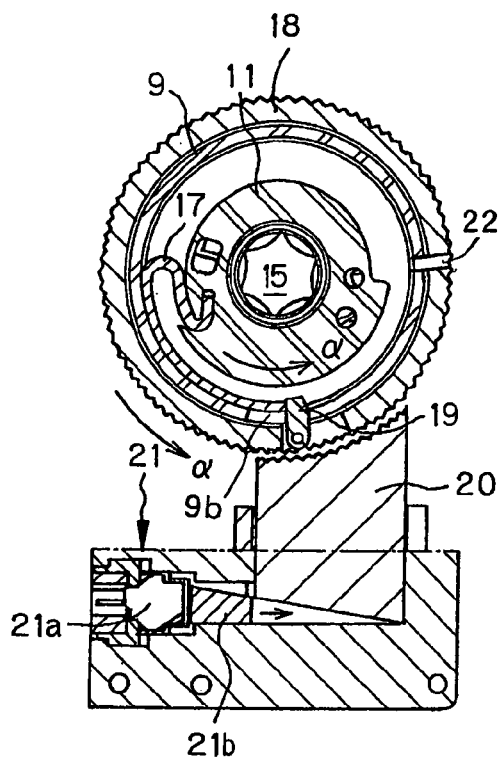
FIGS. 9(a) through 9(d) are illustrations for explaining the seat belt winding by the pretensioner when the second EA mechanism is not actuated in the event of an emergency.
Figure 9B:
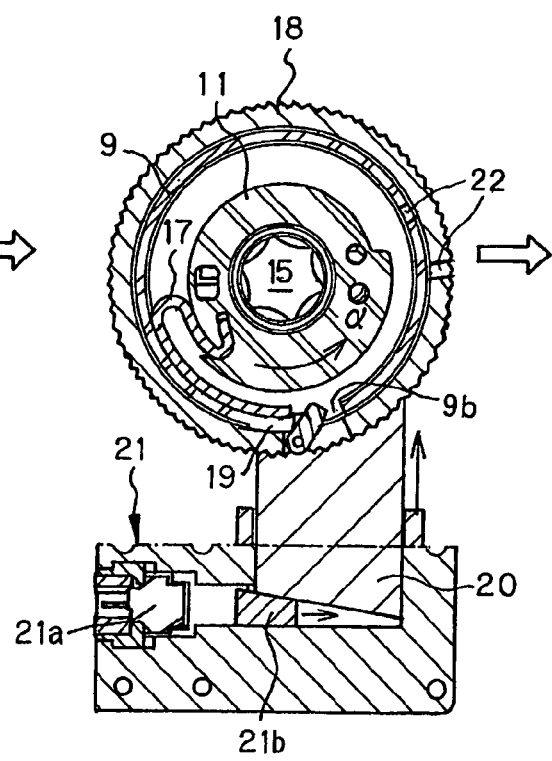
Figure 9C:
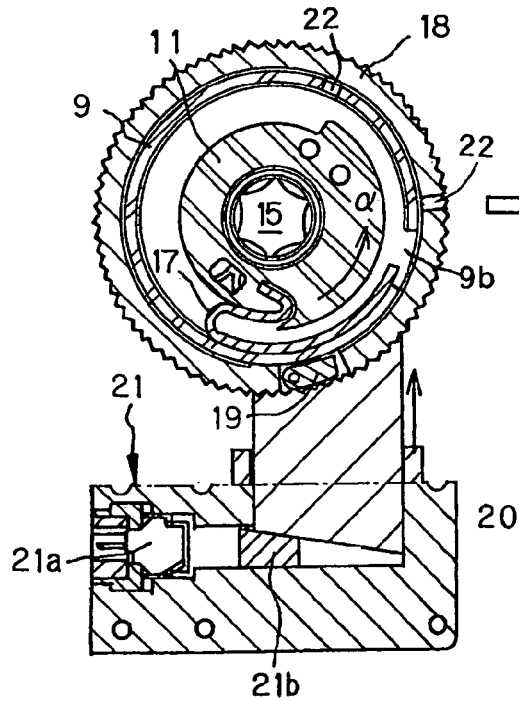

Similarly to the aforementioned case, as shown in FIG. 9(a), the spool 9 starts to be rotated in the seat belt winding direction α because of the actuation of the pretensioner 13. Since the EA plate supporting member 18 is prevented from rotating, the spool 9, the locking base 11, and the energy absorbing plate 17 are about to rotate in the seat belt winding direction α. Therefore, as shown in FIG. 9(b), the shear pin 22 is sheared so that the spool 9, the locking base 11, and the energy absorbing plate 17 rotate in the seat belt winding direction α relative to the EA plate supporting member 18. Then, the end of the other end portion 17b of the energy absorbing plate 17 moves the EA plate operating member 19 to pivot toward the lying position and, after that, the other end wall 9$b_2$ of the opening 9b of the spool 9 further moves the EA plate operating member 19 to pivot toward the lying position. In this manner; the spool 9 rotates together with the locking base 11 and the energy absorbing plate 17 in the seat belt winding direction α with moving the EA plate operating member 19 to pivot. As shown in FIG. 9(c), the EA plate operating member 19 is set to the lying position.

Figure 8B:
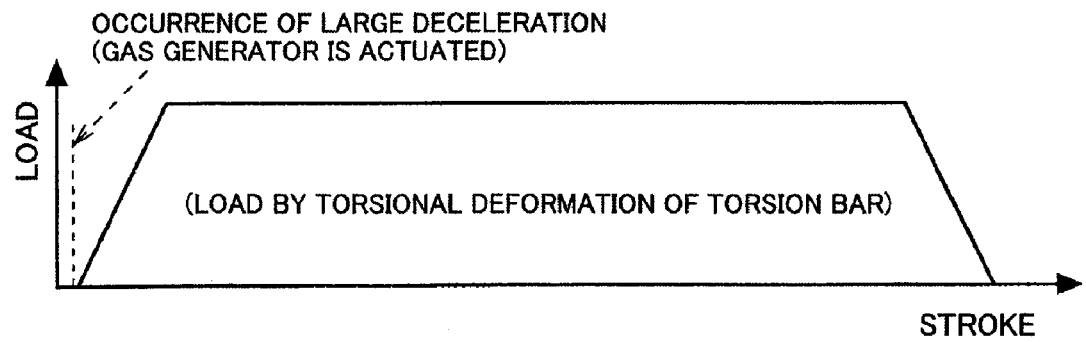
Figure 9D:
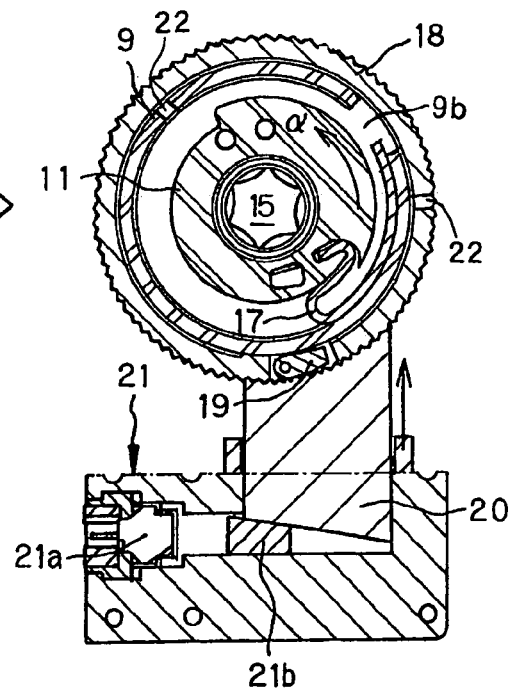
Figure 10A:
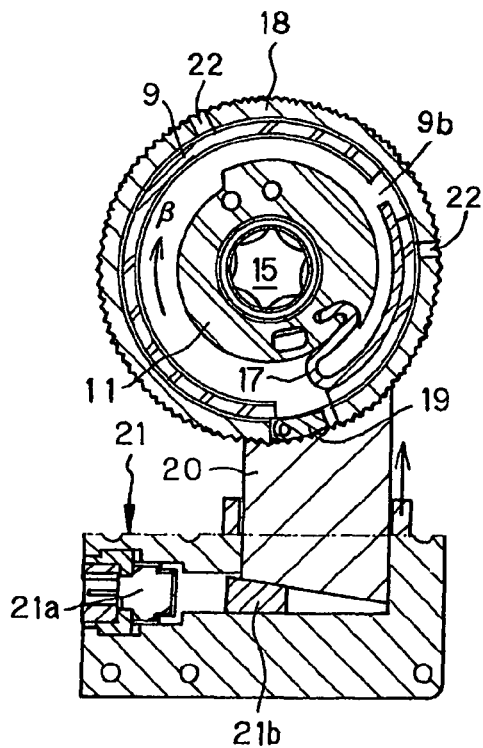
FIGS. 10(a) through 10(d) are illustrations for explaining the non-operation of the second EA mechanism in the event of an emergency.
Figure 10B:
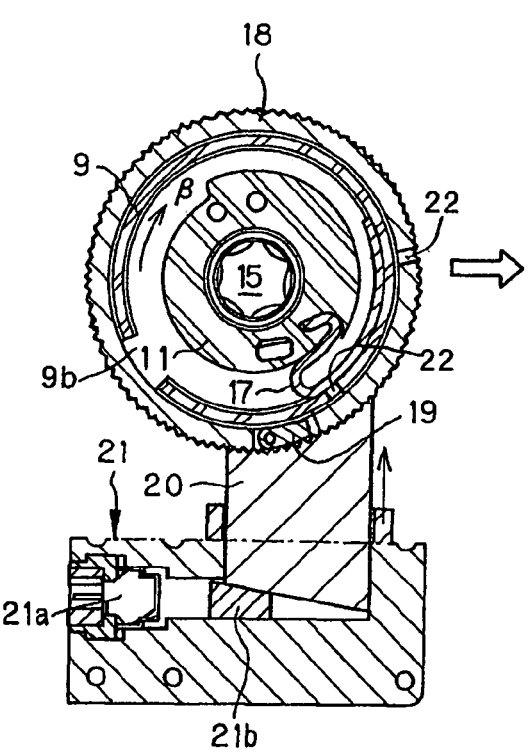
Figure 10C:
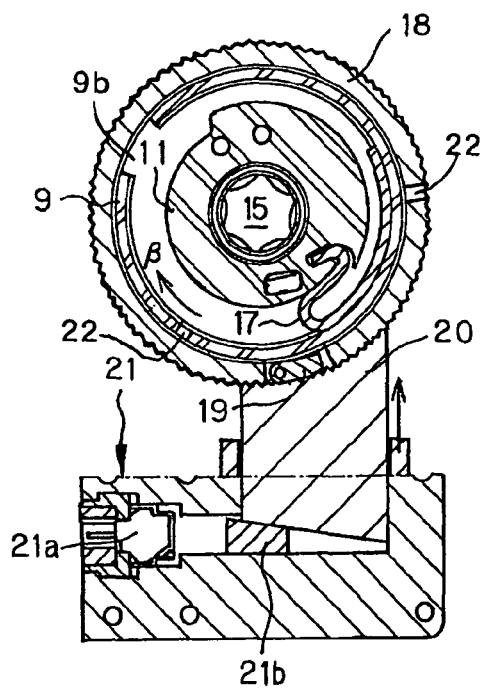
Figure 10D:
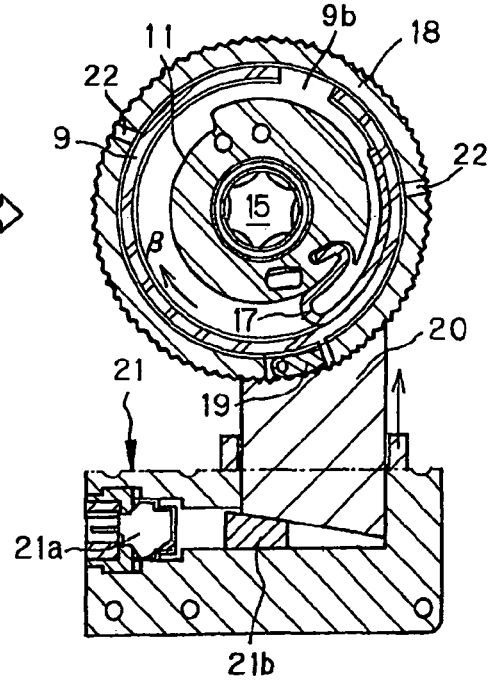

As shown in FIG. 9(d), as the seat belt winding onto the spool 9 by the action of the pretensioner 13 is terminated, the seat belt 4 starts to be withdrawn by inertia of the occupant similarly to the aforementioned case so that, as shown in FIG. 10(a), the spool 9 rotates in the seat belt withdrawing direction β. However, since the locking base 11 is prevented from rotating in the belt withdrawing direction β similarly to the aforementioned case and the EA plate operating member 19 is set to the lying position, the locking base 11 does not rotate and energy absorbing plate 17 keeps its initial state and is not deformed even when the spool 9 rotates. Therefore, as shown in FIGS. 10 (b) through 10(d), only the spool 9 rotates in the seat belt withdrawing direction β. Therefore, as shown in FIG. 8(b), the EA load becomes the load solely by the torsional deformation of the torsion bar 15. Therefore, the energy absorption by the deformation of the energy absorbing plate 17 is not conducted and the energy applied to the occupant is absorbed solely by the torsion bar 15.

In this manner, the limited load of the seat belt 4 is set to be small when, based on the signals outputted from the respective sensors 23, 24, 25, 26, and 27, the CPU determines that the energy absorption by the second EA mechanism 16 is not required such as when such a mild collision that the pretensioner 13 and the airbag is not actuated (for example, a mild collision of a vehicle running at a speed of 30 km/hour or less) occurs.

That is, the load limitation by the second EA mechanism 16 is selected such that there is a case that the load limitation is conducted in the event of an emergency and a case that the load limitation is not conducted in the event of an emergency.

According to the seat belt retractor 3 of this embodiment, the limited load of the seat belt in the event of an emergency is changed based on information of the situation of the emergency such as preliminary information (the weight of an occupant and the position of a seat in the front-rear direction, and the like), collision-predicting information indicating that a collision is predicted, and information indicating the collision severity (the collision speed, the acceleration during the collision, and the type of collision, and the like). Therefore, the limited load of the seat belt during a collision can be set more flexibly and variously in accordance with the information of the emergency situation, such as the conditions of the collision and the physical size of the occupant. Accordingly, the occupant can be more effectively and suitably restrained during a collision.

In this case, the second EA mechanism is actuated by not actuating the driving member 21, while the second EA mechanism 16 is not actuated by actuating the driving member 21. Accordingly, when the actuation of the second EA mechanism 16 is required, there is no need to actuate the driving member to generate reaction gas. Consequently, the occupant is further effectively restrained during a collision because of the effect actuation of the second EA mechanism 16.

Since the energy absorbing plate 17 is provided between the locking base 11 and the EA plate supporting member 18, the pretensioner 13 which must operate in the event of an emergency can be disposed to directly rotate the spool 9 in the belt winding direction α.

Further, since the second EA mechanism 16 is disposed integrally and coaxially with the spool 9, the seat belt retractor 3 which is small-sized in the vertical direction is achieved, thereby increasing the effective space of the vehicle cabin.

Furthermore, since the spool 9 is designed to be rotated in the seat belt winding direction α directly by the pretensioner 13 without the torsion bar 15 intervening, the pretensioner 13 effectively exhibits the seat belt winding in the event of an emergency even though the torsion bar 15 and the second EA mechanism 16 are provided.

The other structure and the other works and effects of the seat belt retractor 3 are the same as those of the seat belt retractor 3 disclosed in Patent Document 1, which is incorporated herein by reference.

FIGS. 11(a), 11(b) through FIG. 13(a), 13(b) are illustrations partially and schematically showing another embodiment of the seat belt retractor according to the present invention.

In the aforementioned embodiment, in case of not actuating the second EA mechanism 16 in the event of an emergency, the EA plate operating member 19 is moved to the lying position by the seat belt winding action of the pretensioner 13 when the gas generator 21a of the driving member 21 is actuated, thereby setting the second EA mechanism 16 to the inoperative state. For this, if the second EA mechanism 16 is first actuated in the event of an emergency, it is impossible to stop the operation of the second EA mechanism 16 on the way even when the gas generator 21a is actuated in order to stop the operation of the second EA mechanism 16. In the aforementioned embodiment, that is, once the second EA mechanism 16 is actuated, it is impossible to stop the operation of the second EA mechanism 16 until the operation of the second EA mechanism 16 is completely terminated whether or not the generator 21a is actuated or not.

On the other hand, in the seat belt retractor 3 of this embodiment, it is possible to stop the operation of the second EA mechanism 16 on the way. In other words, in the seat belt retractor 3 of this embodiment, the operation of the second EA mechanism 16 is controllable selectively to be stopped or not stopped. Hereinafter, the seat belt retractor 3 of this embodiment will be described.

Figure 11A:
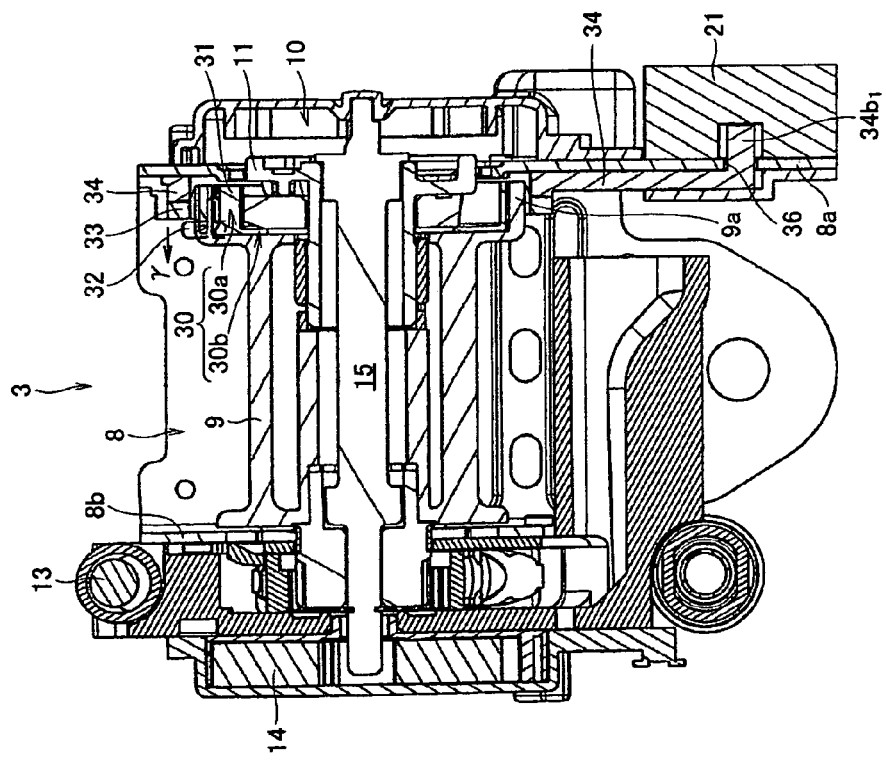
FIGS. 11(a) and 11(b) are sectional views partially and schematically showing another embodiment of a seat belt retractor according to the present invention.
Figure 11B:
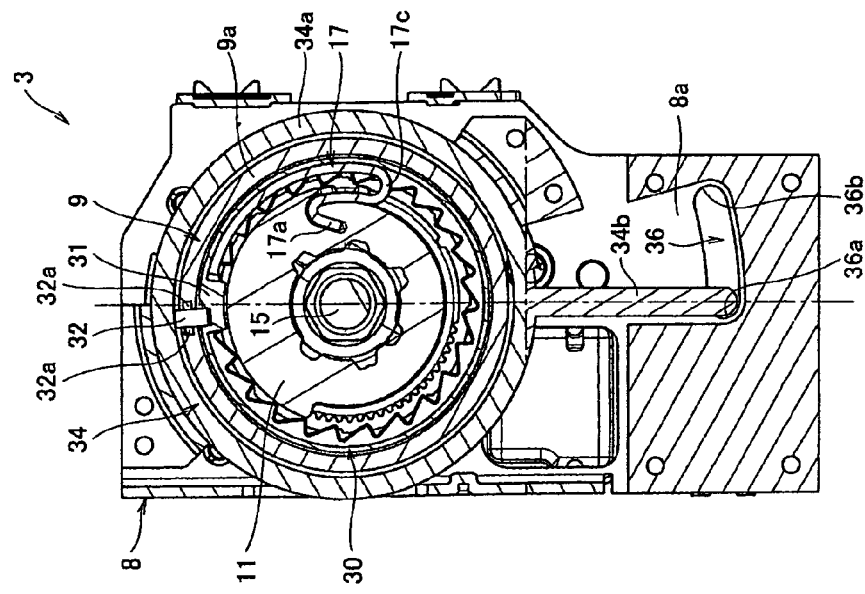

As shown in FIGS. 11(a) and 11(b), the seat belt retractor 3 of this embodiment comprises a casing 30 (corresponding to the supporting member for the energy absorbing member of the present invention) which is disposed in the cylindrical portion 9a on one end side (the right side in FIG. 11(a)) of the spool 9. The casing 30 is formed in a bottomed cylindrical member having a cylindrical portion 30a and a bottom 30b. In this case, the cylindrical portion 30a of the casing 30 is disposed inside the cylindrical portion 9a of the spool 9 and the shaft portion of the locking base 11 penetrates through a circular hole, which is formed in the bottom of the casing 30, without touching the casing 30.

On the inner periphery of the cylindrical portion 30a of the casing 30, an EA plate operating portion 31 which is a convex portion projecting radially is provided. The EA plate operating portion 31 actuates the second EA mechanism 16 similarly to the EA plate operating member 19 of the aforementioned embodiment.

Between the spool 9 and the casing 30, a rod-like stopper 32 is fitted in grooves formed in the spool 9 and the casing 30 such that the stopper 32 is slidable. Therefore, when the stopper 32 is positioned between the spool 9 and the casing 30, the spool 9 and the casing 30 are not allowed to rotate relative to each other so that they rotate together. When the stopper 32 is not positioned between the spool 9 and the casing 30, the spool 9 and the casing 30 are allowed to rotate relative to each other. The stopper 32 has a pair of shear pins 32a projecting therefrom. As the shear pins 32a are fitted into the grooves of the spool 9, the stopper 32 is normally held between the spool 9 and the casing 30 as shown in FIG. 11(b).

Figure 12B:
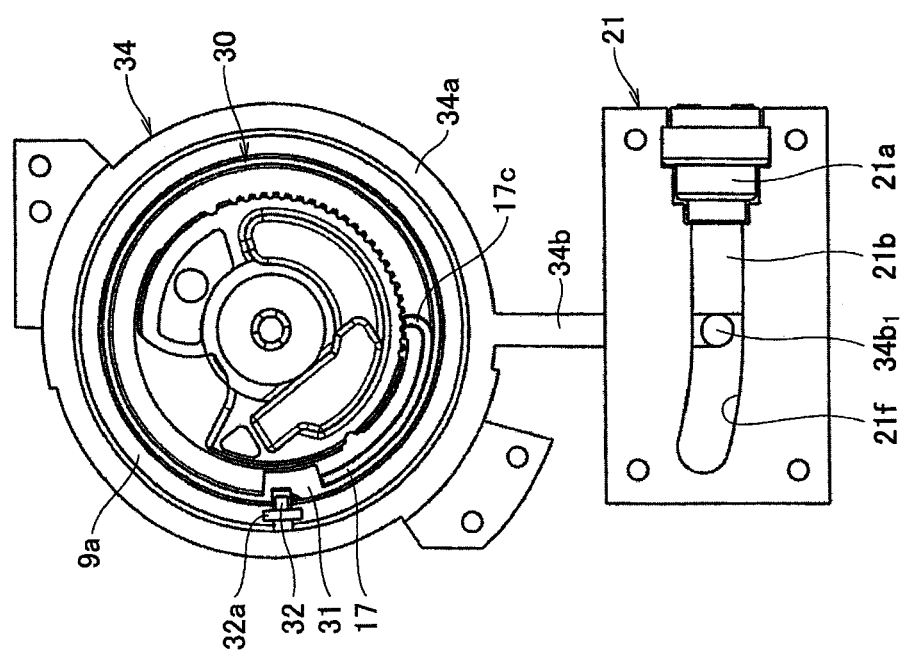
Figure 12A:
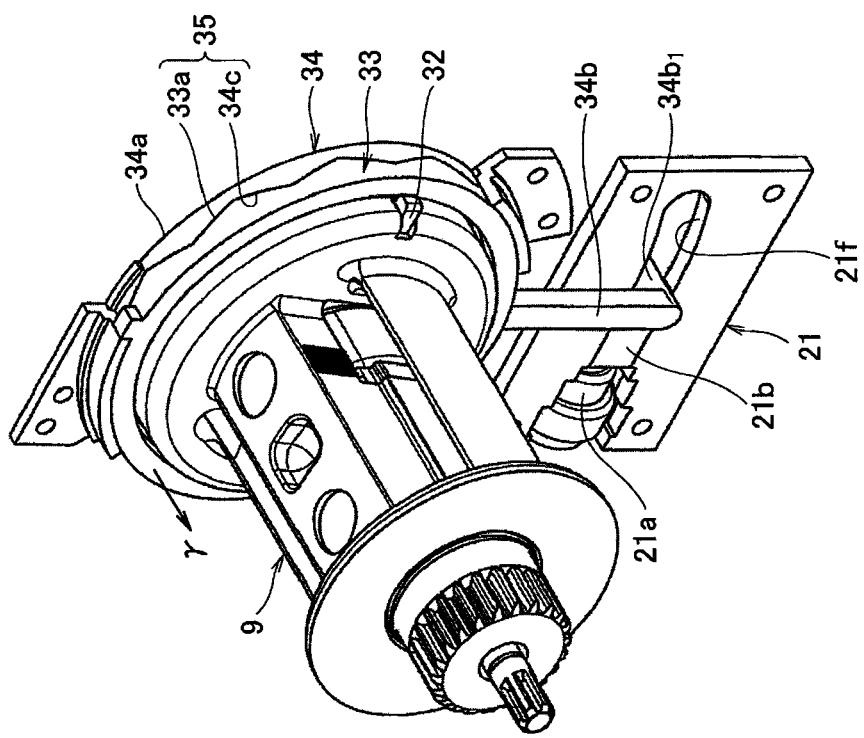

As shown in FIG. 11(a) and FIG. 12(a), a stopper operating member 33 and an EA operation controlling member 34 are disposed on the outer periphery of the cylindrical portion 9a of the spool 9. The stopper operating member 33 is formed in an annular shape and is not allowed to rotate relative to the frame 8 and is allowed to move in the axial direction of the spool 9. As the stopper operating member 33 moves in the axial direction of the spool 9, the stopper 32 is pressed by the stopper operating member 33 so as to get out of the groove of the casing 30. As the stopper 32 gets out of the groove of the casing 30, the spool 9 and the casing 30 are allowed to rotate relative to each other.

Figure 13A:
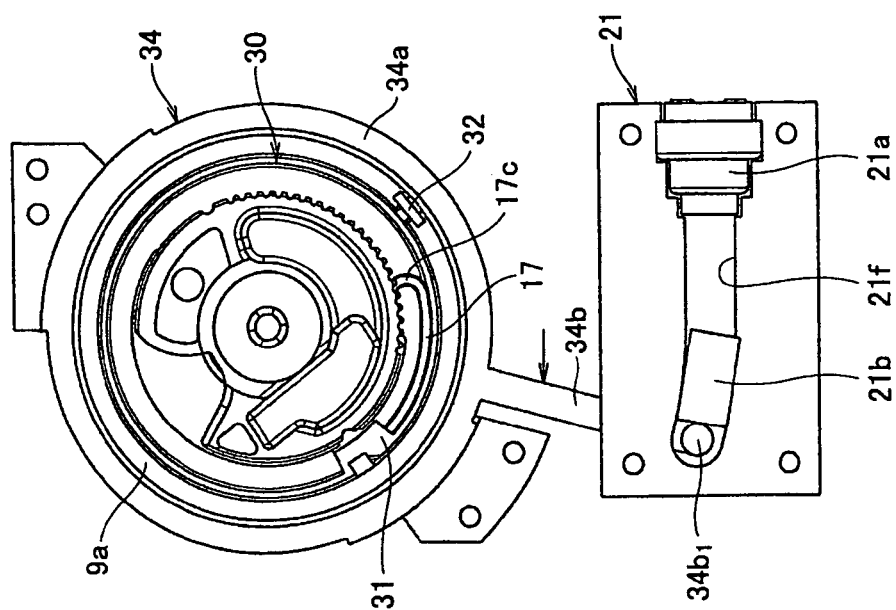

The EA operation controlling member 34 has an annular portion 34a of which diameter is the same as that of the stopper operating member 33, and a long operating lever 34b extending radially outwardly from the annular portion 34a. The stopper operating member 33 and the annular portion 34a of the EA operation controlling member 34 are opposed to each other in the axial direction of the spool 9. On the opposed faces of the stopper operating member 33 and the EA operation controlling member 34, a movement converting mechanism 35 for converting the rotation of the EA operation controlling member 34 to the axial movement (i.e. linear movement) of the stopper operating member 33 is provided. As shown in FIG. 12(a) and FIG. 13(a), the movement converting mechanism 35 comprises a stopper operating member side corrugated portion 33a and an EA operation controlling member side corrugated portion 34c which are annular and formed in the opposed faces of the stopper operation member 33 and the EA operation controlling member 34, respectively.

Normally, as shown in FIG. 12(a), the stopper operating member 33 and the EA operation controlling member 34 are set to the inoperative position where the peaks of the stopper operating member side corrugated portion 33a and the valleys of the EA operation controlling member side corrugated portion 34c are opposed to each other and the valleys of the stopper operating member side corrugated portion 33a and the peaks of the EA operation controlling member side corrugated portion 34c are opposed to each other. In the inoperative position of the stopper operating member 33 and the EA operation controlling member 34, the respective corrugated surfaces of the stopper operating member and the EA operation controlling member 34 are wholly or substantially wholly in contact with each other. In this state, the stopper operating member 33 is placed at a position closest to the EA operation controlling member 34 in the axial direction of the spool 9.

When the EA operation controlling member 34 rotates relative to the stopper operating member 33 in the event of an emergency, as shown in FIG. 13(a), the stopper operating member 33 and the EA operation controlling member 34 are set to the operative position where the peaks of the stopper operating member side corrugated portion 33a and the peaks of the EA operation controlling member side corrugated portion 34c are opposed to each other and the valleys of the stopper operating member side corrugated portion 33a and the valleys of the EA operation controlling member side corrugated portion 34c are opposed to each other. In the operative position of the stopper operating member 33 and the EA operation controlling member 34, only the peaks of the respective corrugated surfaces of the stopper operating member 33 and the EA operation controlling member 34 are in contact with each other. In this case, the stopper operating member 33 moves in the axial direction of the spool 9 and is thus place at a position farthest from the EA operation controlling member 34 in the axial direction of the spool 9. In the operative position of the stopper operating member 33 and the EA operation controlling member 34, the stopper 32 is pressed by the stopper operating member 33 to get out of the groove of the casing 30.

As shown in FIGS. 11(a), 11(b) and FIG. 12(b), an operation lever 34b of the EA operation controlling member 34 has a tip end $34b_1$ which is formed by folding at a right angle or a substantially right angle. The tip end $34b_1$ penetrates a circular guide hole 36, which is formed in one side wall 8a of the frame 8 coaxially with the spool 9. The tip end $34b_1$ of the operation lever 34b penetrating the guide hole 36 further enters into a guide hole 21f of the driving piston 21b of the driving member 21.

Figure 13B:
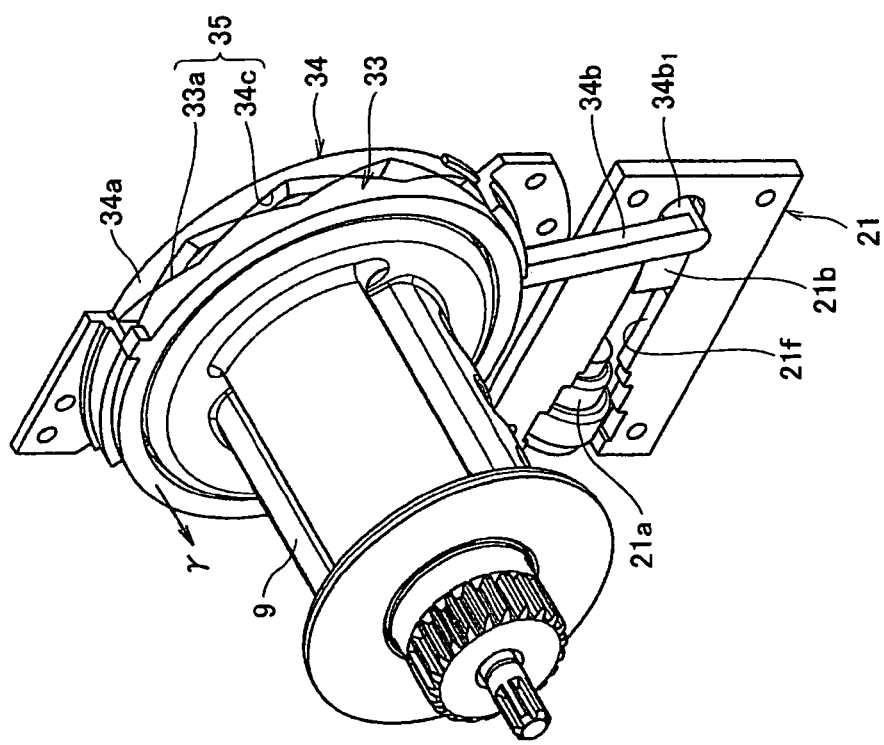

The tip end $34b_1$ of the operation lever 34b is normally located at one end 36a of the guide hole 36 as shown in FIG. 11(b). When the tip end $34b_1$ is located at this position, as shown in FIGS. 12(a) and 12(b), the stopper operating member 33 and the EA operation controlling member 34 are located at the inoperative position and the driving piston 21b in the inoperative state is in contact with the tip end $34b_1$. On the other hand, when the gas generator 21a of the driving member 21 is actuated, the driving piston 21b is actuated by gas generated from the gas generator 21a to press the tip end $34b_1$ of the operation lever 34b. Accordingly, the tip end $34b_1$ is moved to rotate the EA operation controlling member 34 so that the stopper operating member 33 is moved in the axial direction of the spool 9 by means of the movement converting mechanism 35. As the tip end $34b_1$ arrives at the other end $36b$ of the guide hole 36, the top end $34b_1$ is stopped at this position. When the tip end $34b_1$ is located at this position, as shown in FIGS. 13(a) and 13(b), the stopper operating member 33 and the EA operation controlling member 34 are located at the operative position.

The other components of the seat belt retractor 3 of this embodiment are the same as those of the aforementioned embodiment.

Figure 14A:
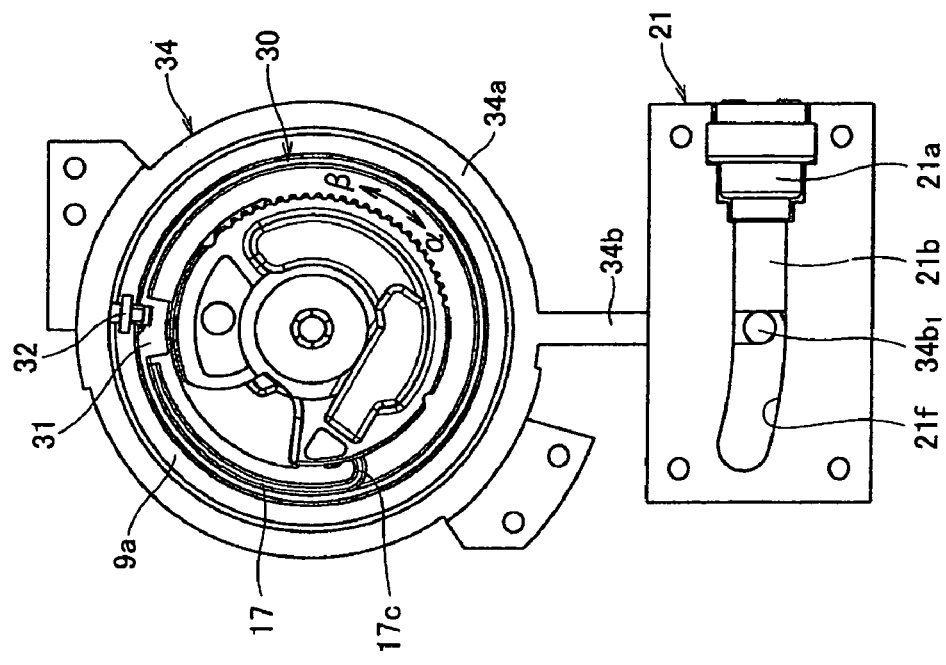
FIGS. 14(a) and 14(b) are illustrations for explaining the winding and withdrawal of the seat belt during normal operation of the seat belt retractor of the embodiment shown in FIGS. 11(a) and 11(b).
Figure 14B:
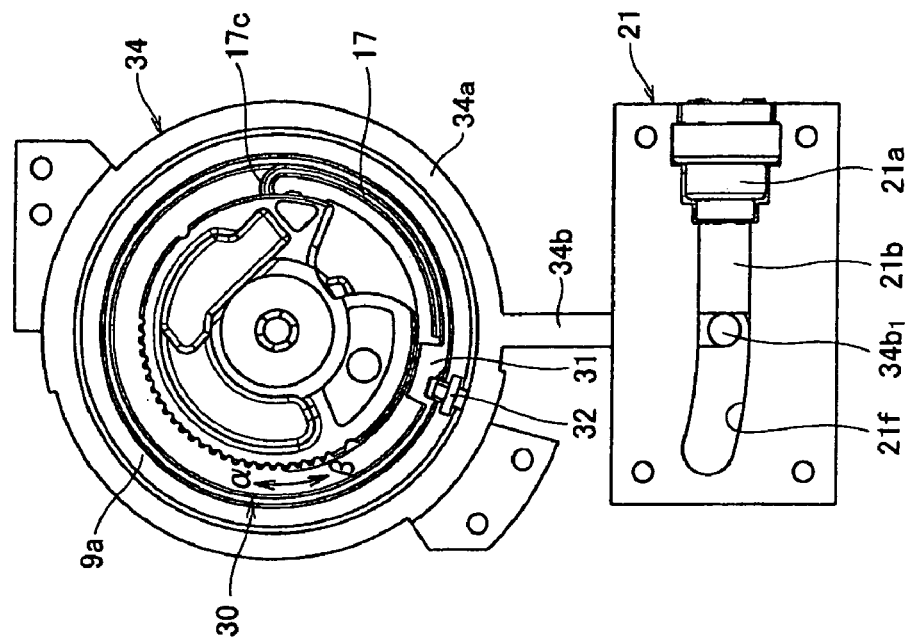

In the seat belt retractor 3 of this embodiment structured as mentioned above, normally the stopper operating member 33 and the EA operation controlling member 34 are set at the inoperative position. In this state, the stopper 32 is located between the spool 9 and the casing 30. In addition, the locking base 11 is allowed to rotate together with the spool 9. Therefore, the spool 9, the locking base 11, and the casing 30 are allowed to rotate together. That is, as the seat belt 4 is withdrawn at a normal withdrawing speed for wearing the seat belt 4, the spool 9, the locking base 11, and the casing 30 rotate together in the seat belt withdrawing direction from a position shown in FIG. 14(a) to a position shown in FIG. 14(b) so that the seat belt 4 is withdrawn. On the other hand, when the seat belt wearing is cancelled, the spool 9, the locking base 11, and the casing 30 rotate together in the seat belt winding direction as the opposite direction so that the seat belt 4 is wound up onto the spool 9 by the spring mechanism 14. During this, even though the spool 9, the locking base 11, and the casing 30 rotate together, the stopper operating member 33 and the EA operation controlling member 34 are maintained at the inoperative position.

In the event of an emergency as mentioned above, the pretensioner 13 is actuated similarly to the aforementioned case. Further, similarly to the aforementioned embodiment, it is assumed that the CPU 29 determines that the operation of the second EA mechanism 16 is required. In this case, the CPU 29 does not actuate the gas generator 21a so that the stopper operating member 33 and the EA operation controlling member 34 are maintained at the inoperative position. As the pretensioner 13 is actuated in this state, the spool 9, the locking base 11, and the casing 30 are rotate together in the seat belt winding direction, thereby removing a slack of the seat belt 4. Then, the seat belt 4 is withdrawn because of inertia of the occupant. At this point, since the locking base 11 is prevented from rotating in the belt withdrawing direction by the locking mechanism 10, only the spool 9 and the casing 30 rotate together in the seat belt withdrawing direction.

Figure 16A:
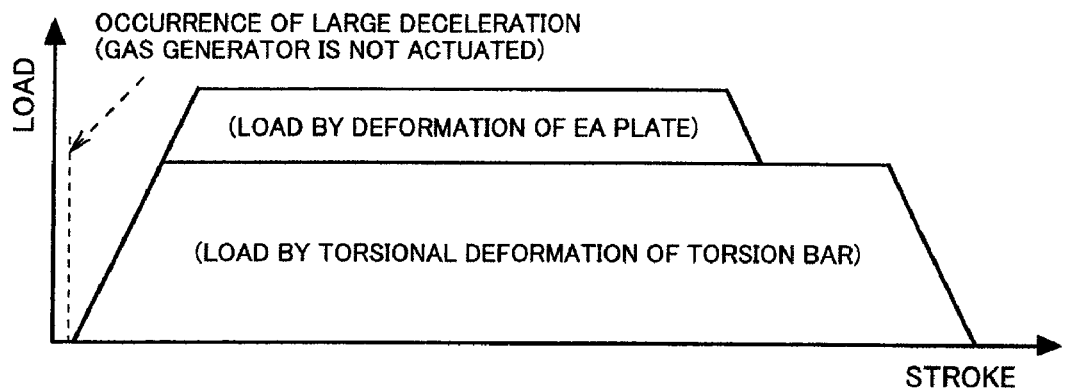
FIGS. 16(a) through 16(c) are graphs showing limited load of the seat belt retractor of the embodiment shown in FIGS. 11(a) and 11(b).

Then, the torsion bar 15 is torsionally deformed similarly to the aforementioned embodiment. Since the energy absorbing plate 17 is pressed by the EA plate operating portion 31 of the casing 30, the energy absorbing plate 17 is gradually deformed as shown in FIGS. 15(a) through 15(c), similarly to the aforementioned embodiment. That is, the EA action by the first EA mechanism (the torsion bar 15) and the EA action by the second EA mechanism 16 are both conducted. Therefore, as shown in FIG. 16(a), the EA load becomes the sum of the load by torsional deformation of the torsion bar 15 and the load by deformation of the energy absorbing plate 17 (similarly to the case shown in FIG. 8(a) of the embodiment). Because of both of the deformation of the torsion bar 15 and the deformation of the energy absorbing plate 17 of the second EA mechanism 16, the energy applied to the occupant is effectively absorbed. As the deformation of the energy absorbing plate 17 is finished, the EA load becomes the load solely by the torsional deformation of the torsion bar 15.

It is assumed that, in the event of an emergency during normal operation of the seat belt retractor 3 as shown in FIGS. 17(1) (a) and 17(2) (a), the CPU 29 determines that the operation of the second EA mechanism 16 is not required similarly to the aforementioned embodiment. At this point, as shown in FIGS. 17(1) (c) and 17(2) (c), the CPU 29 actuates the gas generator 21a so that the gas generator 21a generates gas. With the gas generated, the driving piston 21b presses the tip end $34b_1$ of the operation lever $34b$ so that the tip end $34b_1$ moves to the left in FIG. 12(b) and the annular portion $34a$ of the EA operation controlling member 34 rotates in the clockwise direction in FIG. 12(b) by the operation lever $34b$. Then, as shown in FIGS. 17(1) (d) and 17(2) (d) the tip end $34b_1$ comes at the other end $36b$ of the guide hole 36, thereby stopping the rotation of the annular portion $34a$.

As the annular portion $34a$ rotates, the stopper operating member 33 is forced by the movement converting mechanism 35 in a direction γ so as to press the stopper 32, thereby shearing the shear pins $32a$. Accordingly, the stopper operating member 33 moves in the direction γ and the stopper 32 also moves in the direction γ to get out of the groove of the casing 30. As a result of this, the spool 9 and the casing 30 are allowed to rotate relative to each other. Therefore, the spool 9 rotated in the seat belt withdrawing direction β because the seat belt 4 is forced to be withdrawn due to the inertia of the occupant.

Figure 16B:
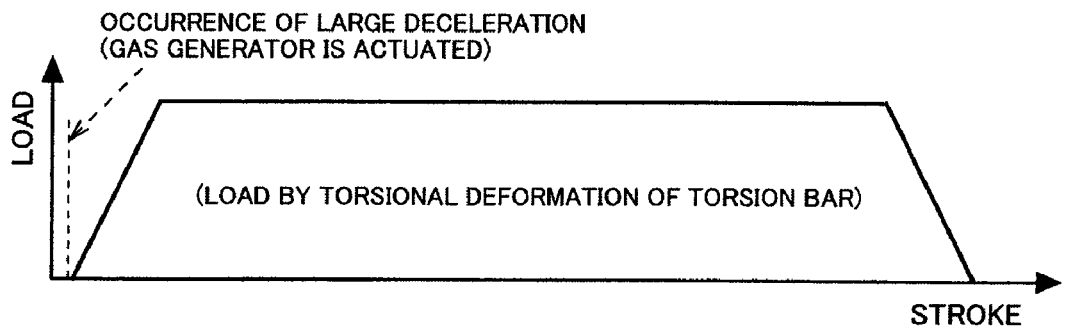

Since the casing 30 does not rotate even though the spool 9 rotates, the energy absorbing plate 17 keeps its initial state and is not deformed. Therefore, only the spool 9 rotates in the seat belt withdrawing direction β similarly to the aforementioned embodiment. Accordingly, the EA load becomes the load solely by the torsional deformation of the torsion bar 15 as shown in FIG. 16(b). In this manner, the energy absorption by deformation of the energy absorbing plate 17 is not conducted so that the energy applied to the occupant is absorbed solely by the torsional deformation of the torsion bar 15.

Figure 16C:
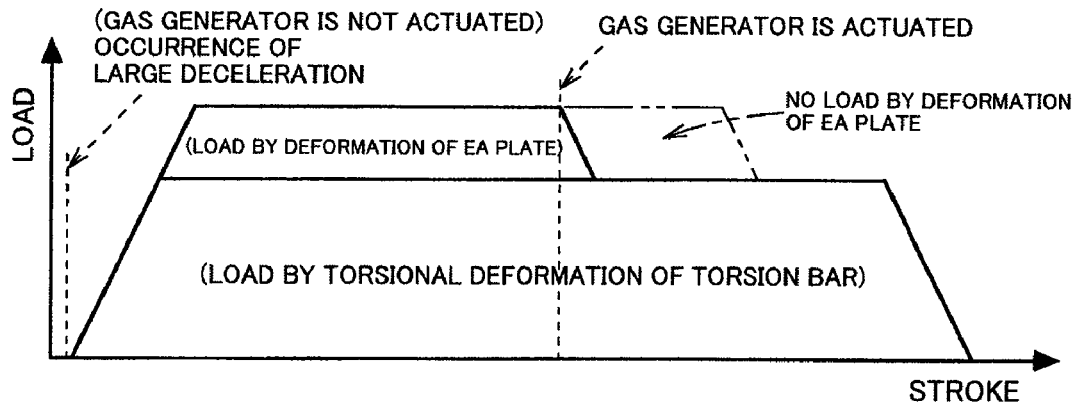

Further, it is assumed that, in the event of an emergency during normal operation of the seat belt retractor 3 as shown in FIGS. 17(1) (a) and 17(2) (a), the CPU 29 determines that the operation of the second EA mechanism 16 is required similarly to the aforementioned embodiment, but the entire operation of the second EA mechanism is not required. In this case, as shown in FIGS. 17(1) (b) and 17(2) (b), the EA action by the first EA mechanism (the torsion bar 15) and the EA action by the second EA mechanism 16 are both conducted. Therefore, as shown in FIG. 16(c), the EA load becomes the sum of the load by torsional deformation of the torsion bar 15 and the load by deformation of the energy absorbing plate 17. However, if the CPU 29 determines that the operation of the second EA mechanism 16 is not required on the way of deformation of the energy absorbing plate 17, the CPU 29 actuates the gas generator 21a as shown in FIGS. 17(1) (c) and 17(2) (c). Then, the operation of the second EA mechanism 16 is stopped so that the energy absorbing plate 17 no more deforms before the entire deformation of the energy absorbing plate 17 is completed. Accordingly, the EA load becomes the load solely by the torsional deformation of the torsion bar 15 because of no load by the deformation of the energy absorbing plate 17 shown by a two-dot chain line in FIG. 16(c) before the entire deformation of the energy absorbing plate 17 is completed.

The timing of stopping the deformation of the energy absorbing plate 17 on the way of deformation of the energy absorbing plate 17 is determined and set by the CPU 29 according to the emergency situation. In the aforementioned embodiment, the CPU 29 determines whether or not the operation of the second EA mechanism 16 is required to be stopped during the operation of the second EA mechanism. However, immediately after the emergency, the CPU 29 may determine whether or not the operation of the second EA mechanism 16 is required to be stopped after actuation of the second EA mechanism 16.

According to the seat belt retractor 3 of this embodiment, when the CPU 29 determines that the operation of the second EA mechanism 16 is required, but the entire operation of the second EA mechanism 16 is not required, the gas generator 21*a* is actuated after the second EA mechanism 16 is actuated but before the entire operation of the second EA mechanism 16 is completed. That is, even after the second EA mechanism 16 is actuated, it is possible to stop the operation of the second EA mechanism 16 depending on the emergency situation. Therefore, the kinetic energy absorption (EA) for the occupant in the event of an emergency can be further finely and correctly conducted. The other works and effects of the seat belt retractor 3 of this embodiment are the same as those of the aforementioned embodiment.

Though the pretensioner 13 is actuated after the gas generator 21*a* of the driving member 21 is actuated in case of not actuating the second EA mechanism 16 in the aforementioned embodiments, the present invention is not limited thereto. That is, in case of not actuating the second EA mechanism 16, the driving member 21 and the pretensioner 13 may be actuated at the same time.

Though the gas generator 21*a* is used as the driving member 21 in the aforementioned embodiments, the present invention is not limited thereto. That is, the driving piston 21*b* may be actuated by driving force of another means using electromagnetic force such as an electromagnetic solenoid. In this case, the electromagnetic solenoid is controlled by the CPU 29 similarly to the aforementioned case. Briefly, various design changes may be made within a scope of the claims of the present invention.

The seat belt retractor of the present invention is suitably used as a seat belt retractor which is used in a seat belt apparatus installed in a vehicle such as an automobile and which prevents a seat belt from being withdrawn with absorbing energy on the occupant by limiting load applied on a seat belt in the event of an emergency.

The disclosures of Japanese Patent Applications No. 2008-293396 filed on Nov. 17, 2008, and No. 2009-027179 filed on Feb. 9, 2009, are incorporated by references.

While the invention has been explained with reference to the specific embodiments of the invention, the explanation is illustrative and the invention is limited only by the appended claims.

What is claimed is:

1. A seat belt retractor for a seat belt, comprising:
a spool for winding the seatbelt, having a groove thereon;
a first seat belt load limiting mechanism for limiting load applied on the seat belt in an emergency;
a second seat belt load limiting mechanism for limiting the load applied to said seat belt when a predetermined condition according to an emergency situation in the emergency is satisfied, the second seat belt load limiting mechanism having an energy absorbing member for absorbing energy applied to the seat belt, and a supporting member supporting the energy absorbing member and being disposed coaxially with said spool and rotatable relative to said spool and having another groove thereon;
a driving member for actuating said second seat belt load limiting mechanism;
a controller for controlling said driving member, electrically connected with the driving member;
a locking mechanism having a locking member rotating together with said spool by transmission of rotation of said spool via the first seat belt load limiting mechanism during a non emergency situation, and being prevented from rotating in a seatbelt withdrawing direction in the emergency, wherein the energy absorbing member is disposed between said locking member and said supporting member and is deformed by the rotation of said spool in the seat belt withdrawing direction to absorb the energy applied to the seat belt when the locking member is actuated in the emergency to prevent rotation of the locking member in the seatbelt withdrawing direction;
a stopper slidably fitted in the groove of the spool and the another groove of the supporting member; and
a stopper operating member operating the stopper,
wherein when said predetermined condition is satisfied, the controller does not actuate the driving member so that said second seat belt load limiting mechanism is actuated,
wherein when said predetermined condition is not satisfied, the controller actuates said second seat belt load limiting mechanism by actuating said driving member, and
wherein when said locking member is prevented from rotating in the seat belt withdrawing direction so that said spool rotates in the seat belt withdrawing direction relative to said locking member, the load applied on said seat belt is limited by at least said first seat belt load limiting mechanism.

2. A seat belt retractor according to claim 1 wherein said energy absorbing member comprises a long energy absorbing plate.

3. A seat belt retractor according to claim 1, wherein said first seat belt load limiting mechanism comprises a torsion bar disposed between said spool and said locking member.

4. A seat belt apparatus, comprising:
the seat belt for restraining an occupant;
the seat belt retractor according to claim 1 for winding the seat belt, said seat belt retractor preventing the seat belt from being withdrawn so as to restrain the occupant in the emergency;
a tongue slidably supported on the seat belt withdrawn from the seat belt retractor; and
a buckle detachably latched with the tongue.

5. A seat belt apparatus according to claim 4, further comprising a pretensioner for directly rotating said spool in a seat belt winding direction in the emergency.

6. A seat belt retractor according to claim 1, wherein the stopper operating member moves in an axial direction of the spool and presses the stopper such that the stopper moves out of engagement with the groove of the supporting member.

7. A seat belt retractor according to claim 6, further comprising an operation controlling member having an annular portion and an operating lever extending radially outwardly from the annular portion.

8. A seat belt retractor according to claim 7, wherein
the driving member has a driving piston and a guide hole therein,
the operating lever has a tip end orthogonally extending from an end of the operating lever, and
the tip end engages in the guide hole and moves from one end of the guide hole to another end of the guide hole to make the operation controlling member operable or inoperable.

9. A seat belt retractor according to claim 8, wherein the spool and the supporting member rotate relative to each other when the operation controlling member is operable.

10. A seat belt retractor according to claim 9, further comprising a pretensioner, wherein the pretensioner directly rotates said spool in a seat belt winding direction when the operation controlling member is operable.

11. A seat belt retractor according to claim 1, wherein while the second seat belt load limiting mechanisms is being actuated when said controller determines that an entire operation of said second seat belt loading limiting mechanism is not required, said controller stops an operation of said second seat belt load limiting mechanism.

* * * * *